(12) United States Patent
Ikemoto et al.

(10) Patent No.: US 9,679,240 B2
(45) Date of Patent: Jun. 13, 2017

(54) ANTENNA DEVICE AND RADIO COMMUNICATION APPARATUS

(71) Applicant: Murata Manufacturing Co., Ltd., Nagaokakyo-shi, Kyoto-fu (JP)

(72) Inventors: Nobuo Ikemoto, Nagaokakyo (JP); Kuniaki Yosui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 311 days.

(21) Appl. No.: 14/283,411

(22) Filed: May 21, 2014

(65) Prior Publication Data

US 2014/0253404 A1 Sep. 11, 2014

Related U.S. Application Data

(63) Continuation of application No. PCT/JP2013/051845, filed on Jan. 29, 2013.

(30) Foreign Application Priority Data

| Feb. 1, 2012 | (JP) | 2012-019835 |
| Apr. 26, 2012 | (JP) | 2012-100863 |
| Nov. 14, 2012 | (JP) | 2012-250117 |

(51) Int. Cl.
*H01Q 7/08* (2006.01)
*G06K 19/077* (2006.01)
(Continued)

(52) U.S. Cl.
CPC ......... *G06K 19/07779* (2013.01); *H01Q 1/38* (2013.01); *H01Q 1/40* (2013.01);
(Continued)

(58) Field of Classification Search
CPC .. H01Q 7/00; H01Q 7/06; H01Q 1/38; H01Q 1/40; H01Q 21/24
USPC .......................................... 343/788
See application file for complete search history.

(56) References Cited

U.S. PATENT DOCUMENTS 6,163,305 A * 12/2000 Murakami ............... H01Q 7/08
343/788
2008/0224946 A1* 9/2008 Lee ....................... H01Q 1/2283
343/895

(Continued)

FOREIGN PATENT DOCUMENTS

| CN | 101479886 A | 7/2009 |
| JP | 2001-188890 A | 7/2001 |

(Continued)

OTHER PUBLICATIONS

Official Communication issued in corresponding European Patent Application No. 13743572.3, mailed on Sep. 3, 2015.
(Continued)

*Primary Examiner* — Dieu H Duong
(74) *Attorney, Agent, or Firm* — Keating & Bennett, LLP

(57) ABSTRACT

An antenna device includes a multilayer body including magnetic layers or dielectric layers that are stacked, a first coil conductor that has a winding axis extending in a direction perpendicular or substantially perpendicular to a stacking direction of the multilayer body, the first coil conductor being provided in the multilayer body, and a second coil conductor that has a winding axis extending in a direction perpendicular or substantially perpendicular to the winding axis of the first coil conductor, the second coil conductor being provided in the multilayer body.

9 Claims, 34 Drawing Sheets

(51) Int. Cl.

| | | |
|---|---|---|
| *H01Q 1/38* | (2006.01) | |
| *H01Q 7/00* | (2006.01) | |
| *H01Q 1/40* | (2006.01) | |
| *H01Q 7/06* | (2006.01) | |
| *H01Q 21/24* | (2006.01) | |
| *H04B 5/00* | (2006.01) | |

(52) U.S. Cl.
CPC ............... *H01Q 7/00* (2013.01); *H01Q 7/06* (2013.01); *H01Q 21/24* (2013.01); *H04B 5/0081* (2013.01)

(56) References Cited

U.S. PATENT DOCUMENTS

| | | | |
|---|---|---|---|
| 2011/0124299 A1* | 5/2011 | Koujima | G06K 19/07749 455/73 |
| 2012/0007787 A1 | 1/2012 | Schantz et al. | |
| 2012/0112978 A1 | 5/2012 | Ito et al. | |

FOREIGN PATENT DOCUMENTS

| | | | |
|---|---|---|---|
| JP | 2003-215271 A | | 7/2003 |
| JP | 2005134942 A | * | 5/2005 |
| JP | 2009-049840 A | | 3/2009 |
| JP | 2010-050849 A | | 3/2010 |
| JP | 4798214 B2 | | 10/2011 |

OTHER PUBLICATIONS

Official Communication issued in International Patent Application No. PCT/JP2013/051845, mailed on May 7, 2013.

* cited by examiner

ANTENNA DEVICE AND RADIO COMMUNICATION APPARATUS

BACKGROUND OF THE INVENTION

1. Field of the Invention

The present invention relates to an antenna device including a multilayer body, and at least first and second coil conductors provided in the multilayer body, and a radio communication apparatus.

2. Description of the Related Art

In the related art, authentication technologies using radio communication (radio frequency identification (RFID)) are widely used for physical distribution, credit card payments, and so on. In RFID systems, radio communication is performed between an RFID tag or contactless IC card and a reader/writer. This radio communication allows the RFID tag or the like and the reader/writer to exchange internally stored data.

As a short-range radio communication standard, Near Field Communication (NFC) using the 13 MHz frequency band exists. NFC is anticipated to be incorporated into communication terminal apparatuses such as cellular phones. As NFC becomes more commonplace, for example, a user only needs to bring his/her communication terminal apparatus into close proximity to a reader/writer installed in a shop to establish radio communication between the two pieces of equipment, thus enabling easy data transfer or data exchange. For this reason, deployment of NFC to various applications such as contactless credit card payments is currently being considered.

A reader/writer for use in RFID systems such as NFC using the 13.56 MHz band is disclosed in, for example, Japanese Patent No. 4798214.

FIG. 36 is a circuit diagram of a transmitting/receiving circuit to which an antenna device described in Japanese Patent No. 4798214 is applied. This transmitting/receiving circuit includes an IC chip 1, an antenna coil 2, a resonant capacitor C13, a matching capacitor C14, capacitors C15 and C18, a resistor R17, and an inductor L15. The capacitor C15 and the inductor L15 form an EMC filter.

In this transmitting/receiving circuit, when transmitting, a transmitting signal exiting the IC chip 1 passes though the EMC filter and the matching capacitor C14 as indicated by rightward arrows before reaching the antenna coil 2, creating a magnetic field in the antenna coil 2 to thereby perform communication. When receiving, an induction voltage is created by the magnetic field passing through the antenna coil 2, and a receiving signal is transmitted to the IC chip 1 after passing through the resistor R17 and the capacitor C18 of the receiving circuit as indicated by leftward arrows.

As another example of equipment for performing the above-mentioned radio communication (that is, radio communication apparatus), a contactless tag described in Japanese Unexamined Patent Application Publication No. 2001-188890 exists. This contactless tag is capable of recording received data and transmitting recorded data. The contactless tag includes an antenna unit that transmits and receives data, an IC chip that processes data, and an impedance matching circuit for matching impedance between the antenna unit and the IC chip.

In order to minimize radiation of unwanted harmonics from the antenna unit, in some cases, a low pass filter (hereinafter, referred to as LPF) including an inductor element is provided between the IC ship and the antenna unit.

When attempting to build the transmitting/receiving circuit described in Japanese Patent No. 4798214 mentioned above as a module, magnetic-field coupling occurs depending on the arrangement of the antenna coil 2 and the inductor L15, which causes unwanted harmonics to be radiated from the antenna coil 2. When attempting to integrate the antenna unit and the inductor element of the LFP together in the contactless tag described in Japanese Unexamined Patent Application Publication No. 2001-188890, magnetic-field coupling occurs depending on the relative arrangement of these components, causing unwanted harmonics to be radiated from the antenna coil 2.

SUMMARY OF THE INVENTION

Preferred embodiments of the present invention provide an antenna device that significantly reduces or prevents radiation of unwanted harmonics, and a radio communication apparatus including such an antenna device.

According to a preferred embodiment of the present invention, an antenna device includes a multilayer body including magnetic layers or dielectric layers that are stacked, a first coil conductor that has a winding axis extending in a direction perpendicular or substantially perpendicular to a stacking direction of the multilayer body, the first coil conductor being provided in the multilayer body, and a second coil conductor that has a winding axis extending in a direction perpendicular or substantially perpendicular to the winding axis of the first coil conductor, the second coil conductor being provided in the multilayer body.

Another preferred embodiment of the present invention provides an antenna device including a multilayer body including magnetic layers or dielectric layers that are stacked, a first coil conductor that has a winding axis extending in a direction perpendicular or substantially perpendicular to a stacking direction of the multilayer body, the first coil conductor being provided in the multilayer body, and a second coil conductor that has a winding axis extending in a direction perpendicular or substantially perpendicular to the winding axis of the first coil conductor, the second coil conductor being provided within a winding area of the first coil conductor.

A further preferred embodiment of the present invention provides an antenna device including a multilayer body including a plurality of base material layers that are stacked, at least one inductor element that includes a plurality of first coil patterns, and an antenna coil that is connected with the inductor element, the antenna coil including a plurality of second coil patterns. The plurality of first coil patterns are arranged in the multilayer body so that a winding axis of the inductor element is oriented along or substantially along a stacking direction of the plurality of base material layers. The plurality of second coil patterns are arranged in the multilayer body so that a winding axis of the antenna coil is oriented along or substantially along a plane direction of the base material layers.

Yet another preferred embodiment of the present invention includes a multilayer body including a plurality of base material layers that are stacked, at least one inductor element that includes a plurality of first coil patterns, and an antenna coil that is connected with the inductor element, the antenna coil including a plurality of second coil patterns. A winding axis of the antenna coil and a winding axis of the inductor element intersect at a predetermined angle, the predetermined angle being determined so that a level of harmonics radiated from the antenna coil is below a specified value.

A further preferred embodiment of the present invention is a radio communication apparatus including the antenna device according to one of the preferred embodiments of the present invention described above.

According to various preferred embodiments of the present invention, a plurality of coil conductors (or an antenna coil and an inductor element) are provided in the multilayer body so that their winding axes are perpendicular or substantially perpendicular to each other. Therefore, even when these coil conductors are integrated into the same multilayer body, magnetic-field coupling between the coil conductors is significantly reduced, minimized or prevented. As a result, it is possible to provide a miniature antenna device with superior radio frequency characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
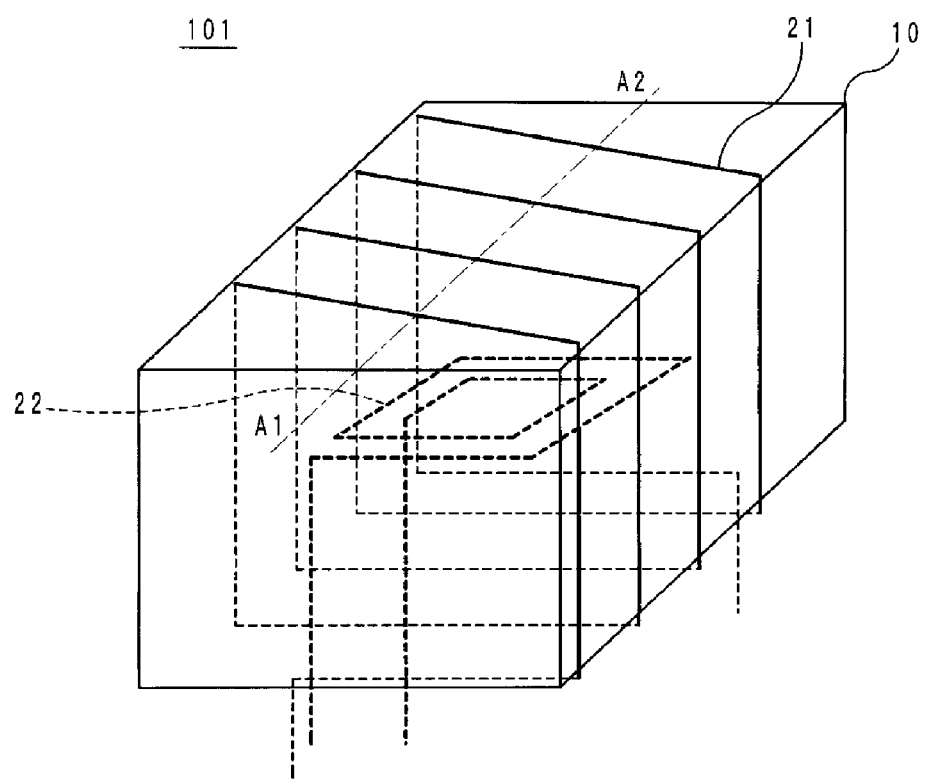
FIG. 1 is a perspective view of an antenna device 101 according to a first preferred embodiment of the present invention.

FIG. 1 is a perspective view of an antenna device 101 according to a first preferred embodiment of the present invention. FIG. 1 is, however, a schematic illustration intended to make two conductor patterns clear.

The antenna device 101 includes a multilayer body 10, and a first coil conductor 21. The multilayer body 10 preferably includes a stack of a plurality of magnetic layers or dielectric layers. The first coil conductor 21 has a winding axis (hereinafter, sometimes referred to as first winding axis) extending in a direction perpendicular or substantially perpendicular to the stacking direction of the multilayer body 10, and is disposed so as to extend around the periphery of the multilayer body 10. Further, a second coil conductor 22 having a winding axis (hereinafter, sometimes referred to as second winding axis) extending in a direction perpendicular or substantially perpendicular to the winding axis of the first coil conductor coil 21 is provided within a winding area of the first coil conductor 21. A winding area refers to an area bounded by the coil opening of the first coil conductor 21 in plan view as seen from the direction of the first winding axis, and both ends along the direction of the first winding axis of the first coil conductor 21 in plan view as seen from the direction of the second winding axis.

Figure 2A:
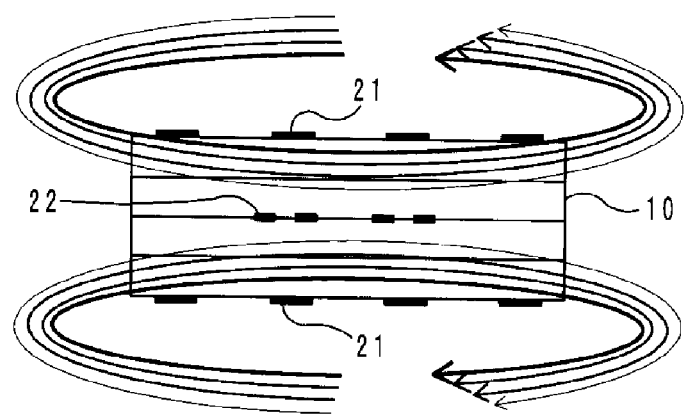
FIG. 2A is a cross-sectional view taken along A1-A2 in FIG. 1.
Figure 2B:
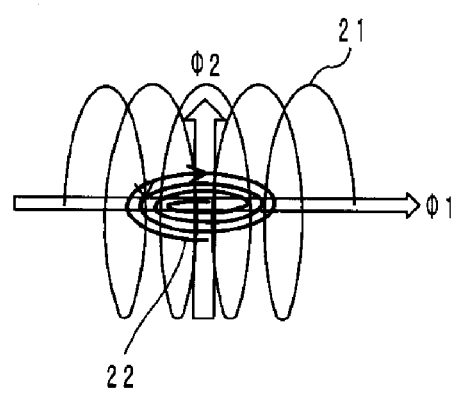
FIG. 2B illustrates the directions of magnetic fields generated by a first coil conductor and a second coil conductor.

FIG. 2A is a cross-sectional view taken along A1-A2 in FIG. 1. FIG. 2B illustrates the directions of magnetic fields generated by the first coil conductor and the second coil conductor. As is apparent from FIG. 2A, the second coil conductor 22 is provided within the winding area of the first coil conductor 21 so that the opening surface of the second coil conductor is parallel or substantially parallel to the winding axis of the first coil conductor 21. In addition, as is apparent from FIG. 2B, a magnetic flux $\phi 1$ generated along the winding axis of the first coil conductor 21 is perpendicular or substantially perpendicular to a magnetic flux $\phi 2$ generated along the winding axis of the second coil conductor 22.

The winding axis of the second coil conductor 22 is perpendicular or substantially perpendicular to the direction of the magnetic field within the winding area of the first coil conductor 21. Consequently, it is possible to reduce magnetic-field coupling between the first coil conductor 21 and the second coil conductor 22.

The magnetic flux density of the magnetic field generated by the first coil conductor 21 is highest at the interface between the first coil conductor 21 and the multilayer body, and becomes lower toward the center of the multilayer body. Accordingly, because the second coil conductor 22 is located in the vicinity of the center of the multilayer body 10, interference between the first coil conductor 21 and the second coil conductor 22 is significantly reduced.

Further, the magnetic field generated by the first coil conductor 21 and the magnetic field generated by the second coil conductor 22 both pass through the multilayer body. Consequently, in a case where the multilayer body includes magnetic layers, a large predetermined inductance value is obtained with a small number of windings. In particular, because the second coil conductor is embedded in the multilayer body including magnetic layers, leakage of magnetic field to the outside is small and, accordingly, a large inductance value is obtained despite the small size.

The first coil conductor preferably is used as an antenna coil, and the second coil conductor preferably is used as the inductor of a filter circuit connected to the antenna coil. In a case where the multilayer body is defined by a magnetic body, the combination of the first coil conductor 21 and the multilayer body functions as a magnetic coil antenna. In a case where the multilayer body is defined by a magnetic body, even when the second coil conductor is used as the inductor of an EMC filter, the magnetic field of harmonic components generated by the second coil conductor is not expelled to the outside.

Second Preferred Embodiment

Figure 3:
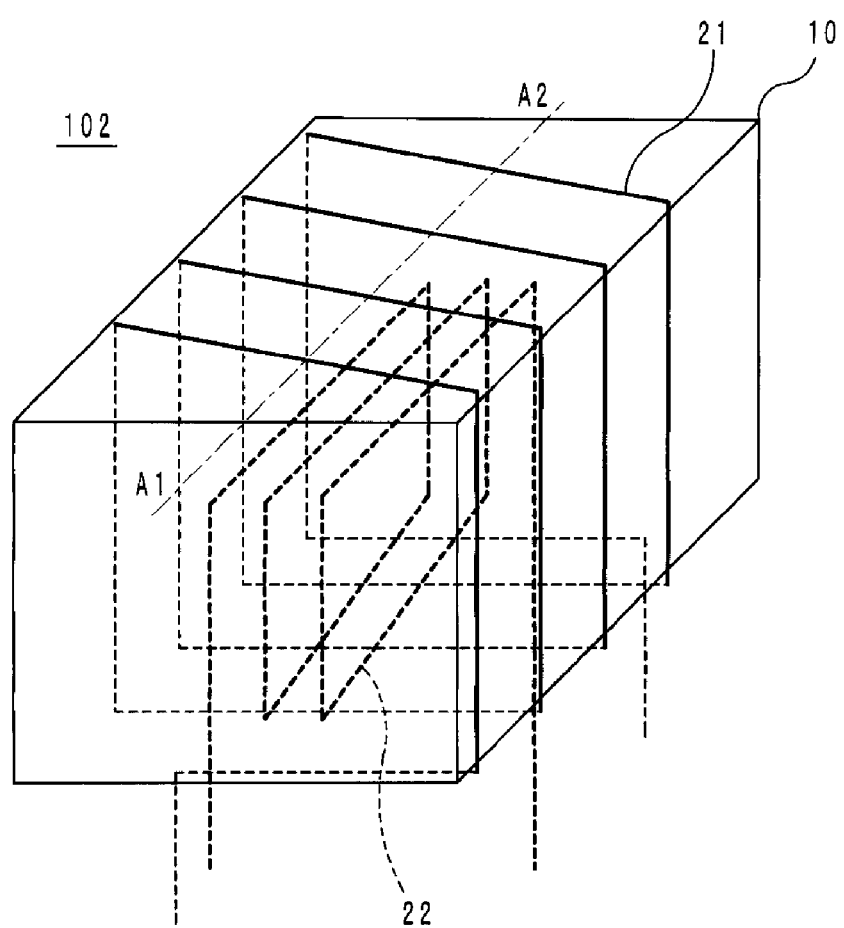
FIG. 3 is a perspective view of an antenna device 102 according to a second preferred embodiment of the present invention.

FIG. 3 is a perspective view of an antenna device 102 according to a second preferred embodiment of the present invention. FIG. 3 is, however, a schematic illustration intended to make two conductor patterns clear.

The antenna device 102 includes a multilayer body 10, and a first coil conductor 21. The multilayer body 10 includes a stack of a plurality of magnetic layers or dielectric layers. The first coil conductor 21 has a winding axis extending in a direction perpendicular or substantially perpendicular to the stacking direction of the multilayer body 10, and is disposed so as to run around the periphery of the multilayer body 10. A second coil conductor 22 having a winding axis extending in a direction perpendicular or substantially perpendicular to the winding axis of the first coil conductor coil 21 is provided within a winding area of the first coil conductor 21. The definition of a winding area is as described above. The antenna device 102 differs from the antenna device 101 according to the first preferred embodiment illustrated in FIG. 1 in the direction of the winding axis of the second coil conductor 22. In the second preferred embodiment, the opening surface of the second coil conductor is parallel or substantially parallel to the stacking direction.

Figure 4A:
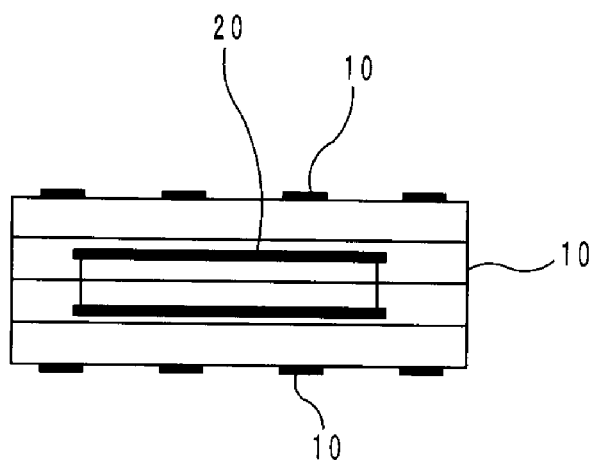
FIG. 4A is a cross-sectional view taken along A1-A2 in FIG. 3.
Figure 4B:
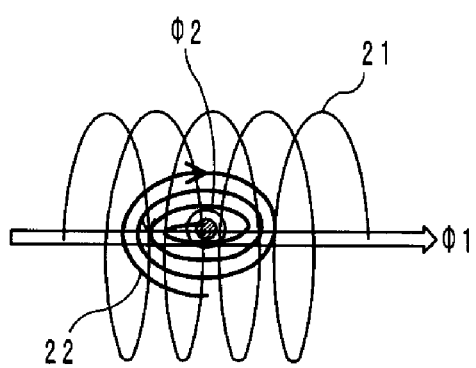
FIG. 4B illustrates the directions of magnetic fields generated by the first coil conductor and the second coil conductor.

FIG. 4A is a cross-sectional view taken along A1-A2 in FIG. 3. FIG. 4B illustrates the directions of magnetic fields generated by the first coil conductor and the second coil conductor. As is apparent from FIG. 4A, the second coil conductor 22 is provided within the winding area of the first coil conductor 21 so that the opening surface of the second coil conductor is parallel or substantially parallel to the winding axis of the first coil conductor 21. In addition, as is apparent from FIG. 4B, a magnetic flux $\phi 1$ generated along the winding axis of the first coil conductor 21 is perpendicular or substantially perpendicular to a magnetic flux ϕ2 generated along the winding axis of the second coil conductor 22.

The antenna device 102 according to the second preferred embodiment also provides the same effect as that of the antenna device 101 according to the first preferred embodiment.

Third Preferred Embodiment

Figure 5:
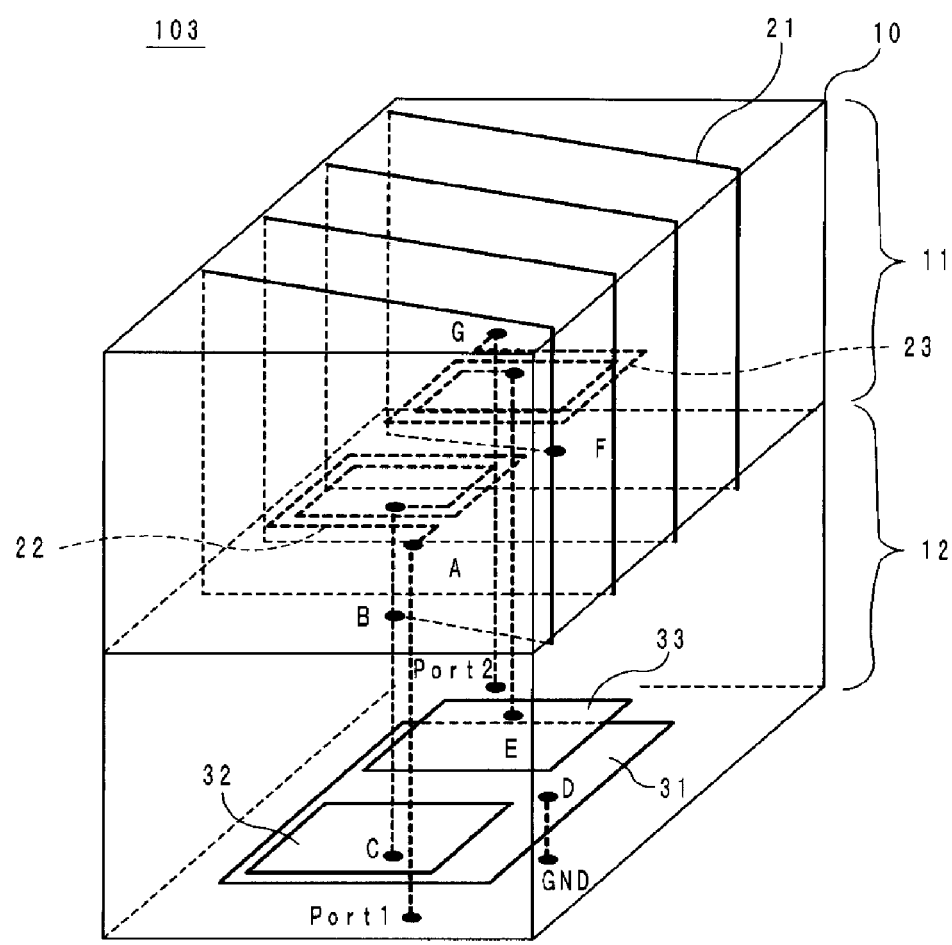
FIG. 5 is a perspective view of an antenna device 103 according to a third preferred embodiment of the present invention.

FIG. 5 is a perspective view of an antenna device 103 according to a third preferred embodiment of the present invention. The height of the antenna device 103 is depicted in exaggerated form to make conductor patterns clear. In the antenna device 103, a multilayer body 10 includes a multilayer portion 11 of a plurality of magnetic layers, and a multilayer portion 12 of a plurality of dielectric layers (non-magnetic layers). A first coil conductor 21 has a winding axis extending in a direction perpendicular or substantially perpendicular to the stacking direction of the multilayer portion 11 of magnetic layers, and is disposed so as to run around the magnetic layer portion of the multilayer body 10. A second coil conductor 22 and a third coil conductor 23 are provided within a winding area of the first coil conductor 21 so that each of the second coil conductor 22 and the third coil conductor 23 has a winding axis extending in a direction perpendicular or substantially perpendicular to the winding axis of the first coil conductor coil 21. The definition of a winding area is as described above. Capacitance-generating electrodes 31, 32, and 33 are provided in the multilayer portion 12 of dielectric layers.

One end B of the first coil conductor 21 is connected to one end of the second coil conductor 22, and the other end F of the first coil conductor 21 is connected to one end of the third coil conductor 23. The other end A of the second coil conductor 22 is extended to one terminal port1, and the other end G of the third coil conductor 23 is extended to the other terminal port2. The one end B of the second coil conductor 22 is connected to the capacitance-generating electrode 32, and one end F of the third coil conductor 23 is connected to the capacitance-generating electrode 33.

The capacitance-generating electrode 31 is opposed to the capacitance-generating electrodes 32 and 33. The capacitance-generating electrode 31 is connected to a ground terminal GND.

Figure 6:
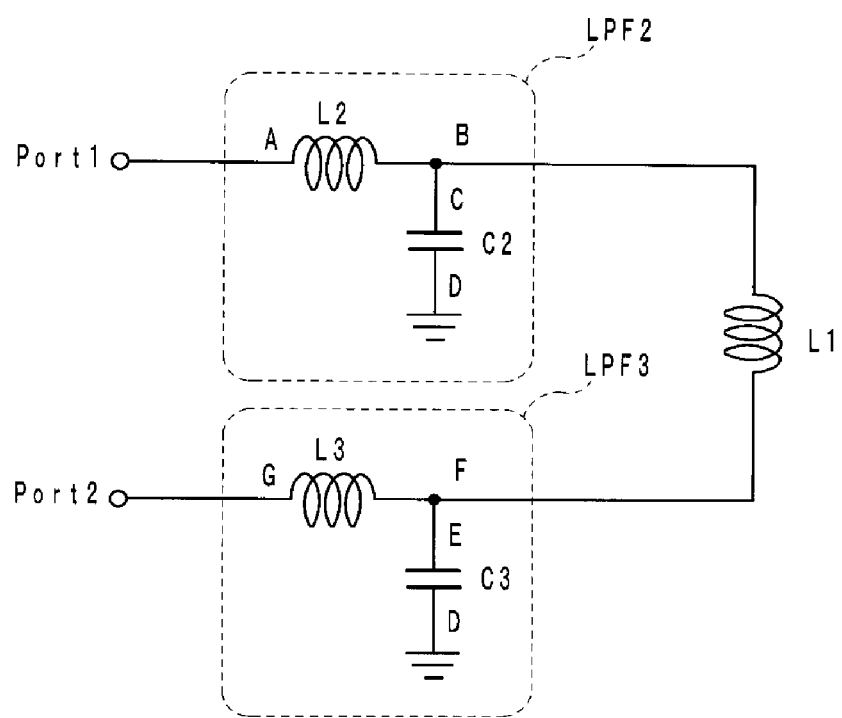
FIG. 6 is a circuit diagram of the antenna device 103.

FIG. 6 is a circuit diagram of the antenna device 103. In FIG. 6, an inductor L1 corresponds to an antenna coil defined by the first coil conductor 21, an inductor L2 corresponds to an inductor defined by the second coil conductor 22, and an inductor L3 corresponds to an inductor defined by the third coil conductor 23. The capacitor C2 corresponds to the capacitance created between the capacitance-generating electrode 32 and the capacitance-generating electrode 31, and the capacitor C3 corresponds to the capacitance created between the capacitance-generating electrode 33 and the capacitance-generating electrode 31. A low pass filter LPF2 is defined by the inductor L2 and the capacitor C2, and a low pass filter LPF3 is defined by the inductor L3 and the capacitor C3.

Figure 7:
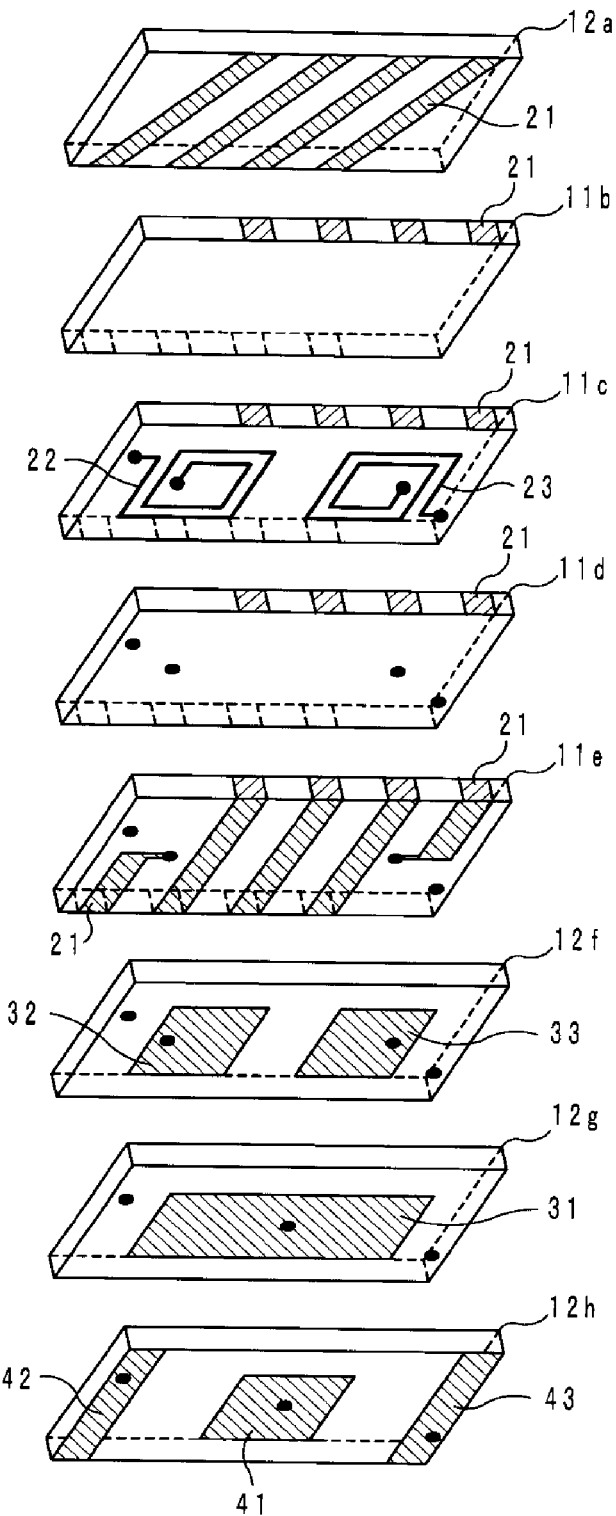
FIG. 7 is an exploded perspective view of the antenna device 103.

FIG. 7 is an exploded perspective view of the antenna device 103. The antenna device 103 is constructed in a multilayer body including a stack of a plurality of magnetic layers 11b, 11c, 11d and 11e, and a plurality of dielectric layers 12a, 12f, 12g, and 12h. In FIG. 7, the first coil conductor 21 is provided on the undersurface of the dielectric layer 12a, the undersurface of the magnetic layer 11e, and side surfaces of the magnetic layers 11b, 11c, and 11d.

The second coil conductor 22 and the third coil conductor 23 are provided on the undersurface of the magnetic layer 11c. The capacitance-generating electrodes 32 and 33 are provided on the undersurface of the dielectric layer 12f, and the capacitance-generating electrode 31 is provided on the undersurface of the dielectric layer 12g. External terminal electrodes 41, 42, and 43 are provided on the undersurface of the dielectric layer 12h.

Figure 8:
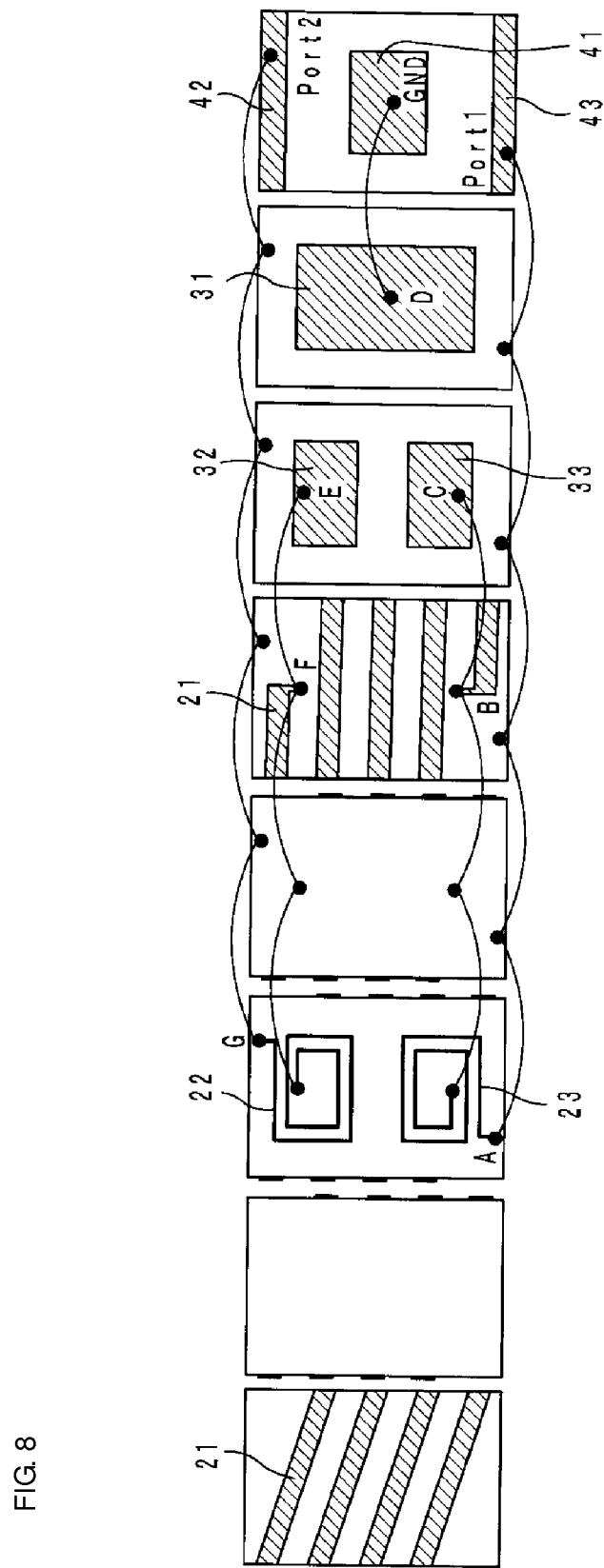
FIG. 8 is an exploded plan view illustrating conductor patterns provided on layers illustrated in FIG. 7 and how the conductor patterns are connected, as seen from the undersurface (surface facing the mounting surface side) of each of the layers.

FIG. 8 is an exploded plan view illustrating conductor patterns provided on the layers illustrated in FIG. 7 and how the conductor patterns are connected, as seen from the undersurface (surface facing the mounting surface side) of each of the layers. One end of the first coil conductor 21 is connected to one end (inner peripheral end) of the second coil conductor 22 by a via-hole conductor, and the other end of the first coil conductor 21 is connected to one end (inner peripheral end) of the third coil conductor 23 by a via-hole conductor. The other end (outer peripheral end) of the second coil conductor 22 is connected to the external terminal electrode 42 by a via-hole conductor. The other end (outer peripheral end) of the third coil conductor 23 is connected to the external terminal electrode 43 by a via-hole conductor. The capacitance-generating electrode 31 is connected to the external terminal electrode 41 by a via-hole conductor.

In this way, an antenna device including a low pass filter is constructed in a single multilayer body 10. Moreover, by connecting a low pass filter to either end of the first coil conductor 21, harmonic components are removed more reliably.

Fourth Preferred Embodiment

Figure 9:
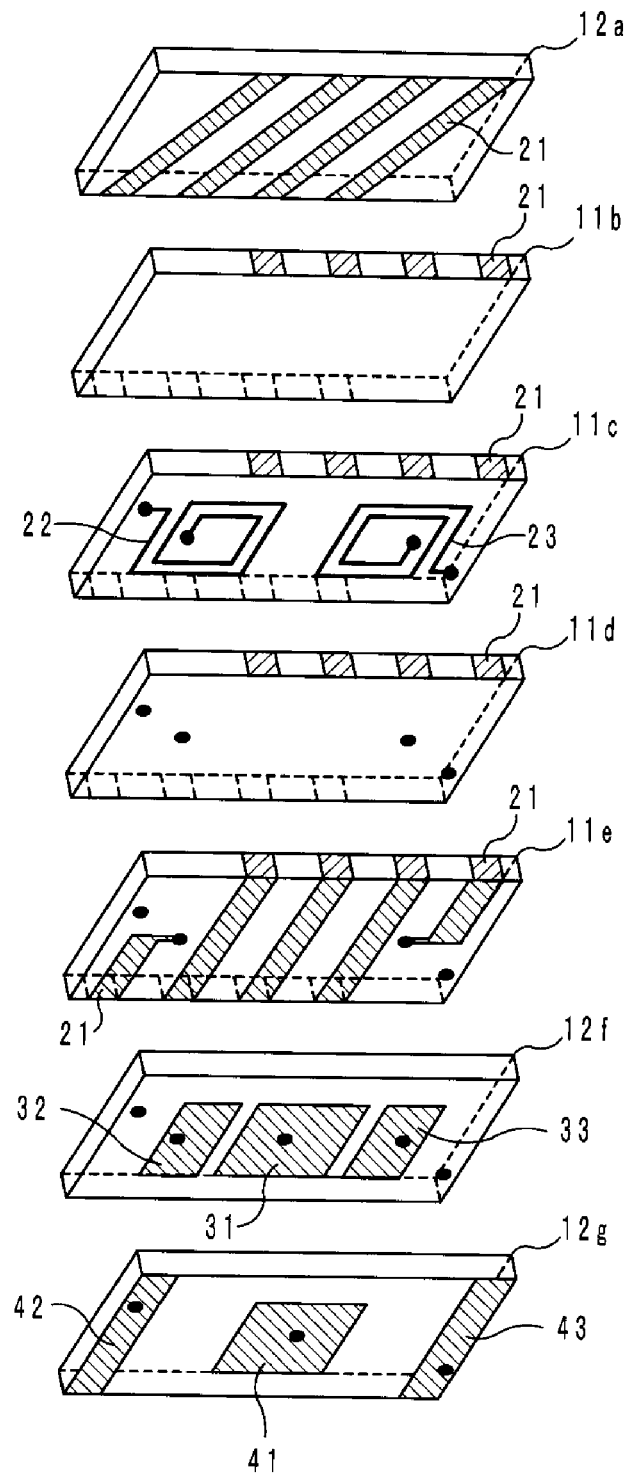
FIG. 9 is an exploded perspective view of an antenna device according to a fourth preferred embodiment of the present invention.
Figure 10:
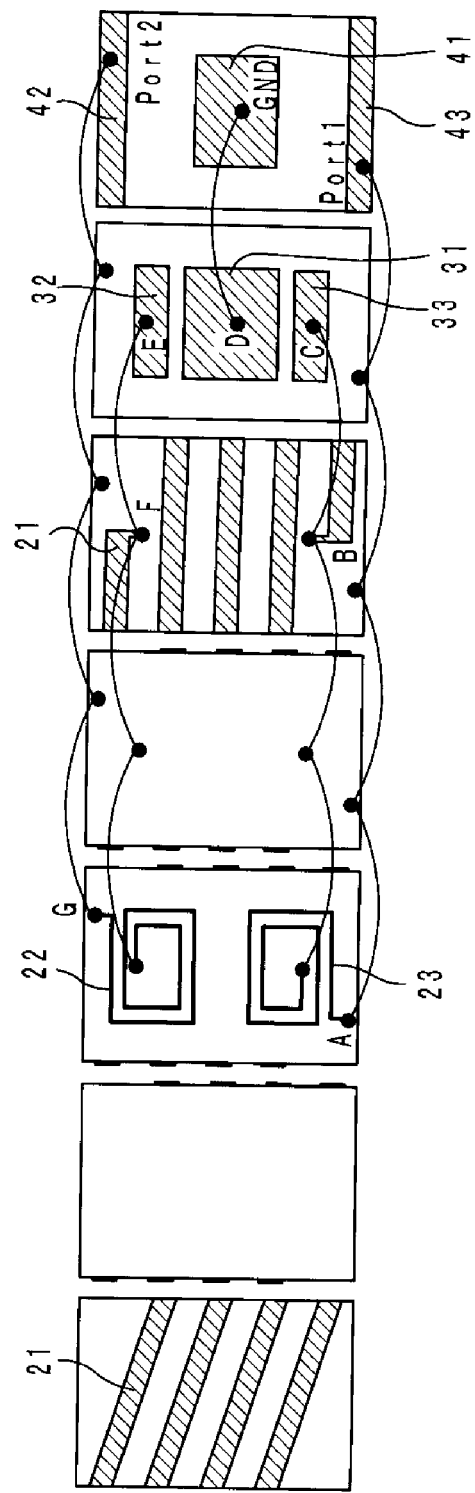
FIG. 10 is an exploded plan view illustrating conductor patterns provided on layers illustrated in FIG. 9 and how the conductor patterns are connected, as seen from the undersurface (surface facing the mounting surface side) of each of the layers.

FIG. 9 is an exploded perspective view of an antenna device according to a fourth preferred embodiment of the present invention. FIG. 10 is an exploded plan view illustrating conductor patterns provided on layers illustrated in FIG. 9 and how the conductor patterns are connected, as seen from the undersurface (surface facing the mounting surface side) of each of the layers. This antenna device is constructed in a multilayer body including a stack of a plurality of magnetic layers 11b, 11c, 11d and 11e, and a plurality of dielectric layers 12a, 12f, and 12g. In FIG. 9, capacitance-generating electrodes 31, 32, and 33 are provided on the undersurface of the dielectric layer 12f, and external terminal electrodes 41, 42, and 43 are provided on the undersurface of the dielectric layer 12g.

The fourth preferred embodiment differs from the example illustrated in FIG. 7 in that the capacitance-generating electrodes are provided on a single layer. Otherwise, the fourth preferred embodiment is the same as the example illustrated in FIG. 7.

Fifth Preferred Embodiment

Figure 11:
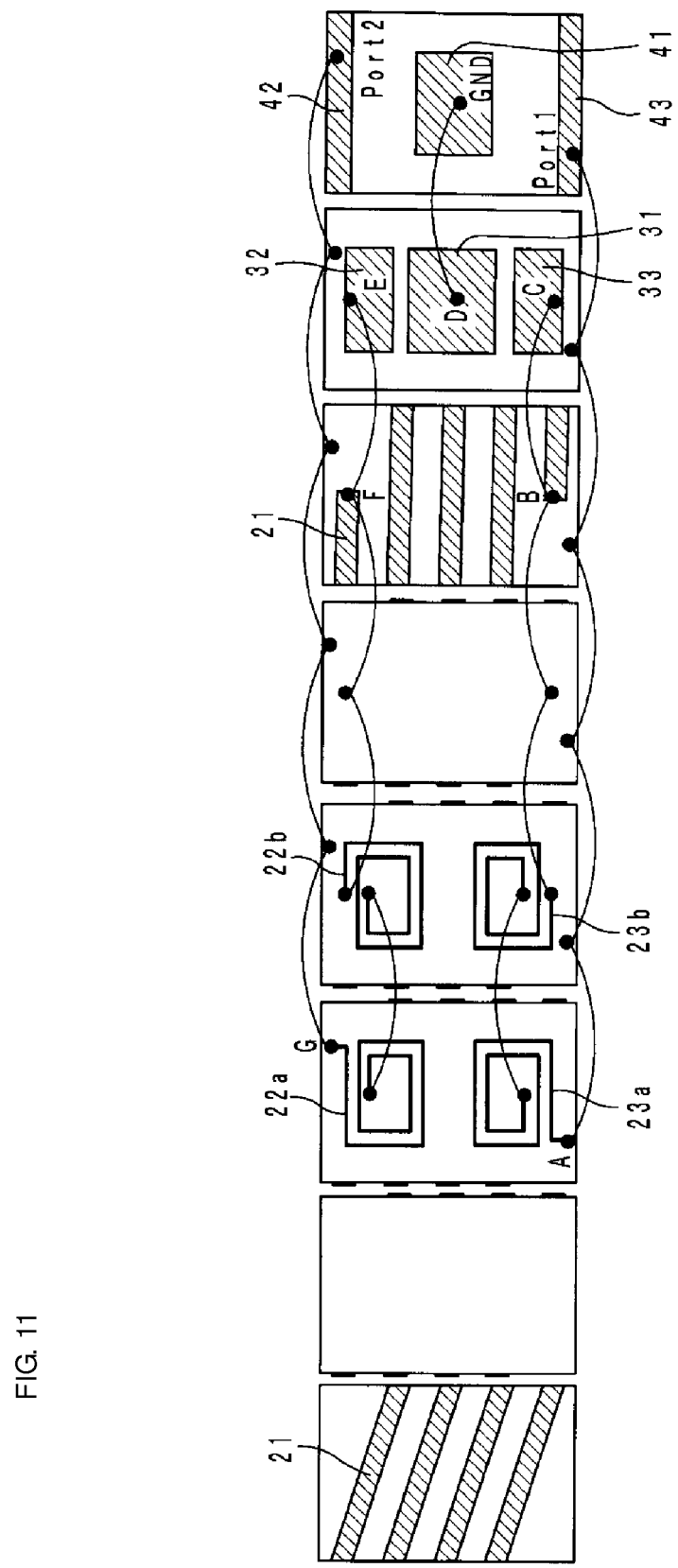
FIG. 11 is an exploded plan view of an antenna device according to a fifth preferred embodiment of the present invention, as seen from the undersurface (surface facing the mounting surface side) of each layer.

FIG. 11 is an exploded plan view of an antenna device according to a fifth preferred embodiment of the present invention, as seen from the undersurface (surface facing the mounting surface side) of each layer. As is apparent from comparison with the example illustrated in FIG. 10, second coil conductors 22a and 22b are arranged to extend over two layers. Likewise, third coil conductors 23a and 23b are provided. Otherwise, the antenna device is the same as the antenna device illustrated in FIG. 10.

Sixth Preferred Embodiment

Figure 12:
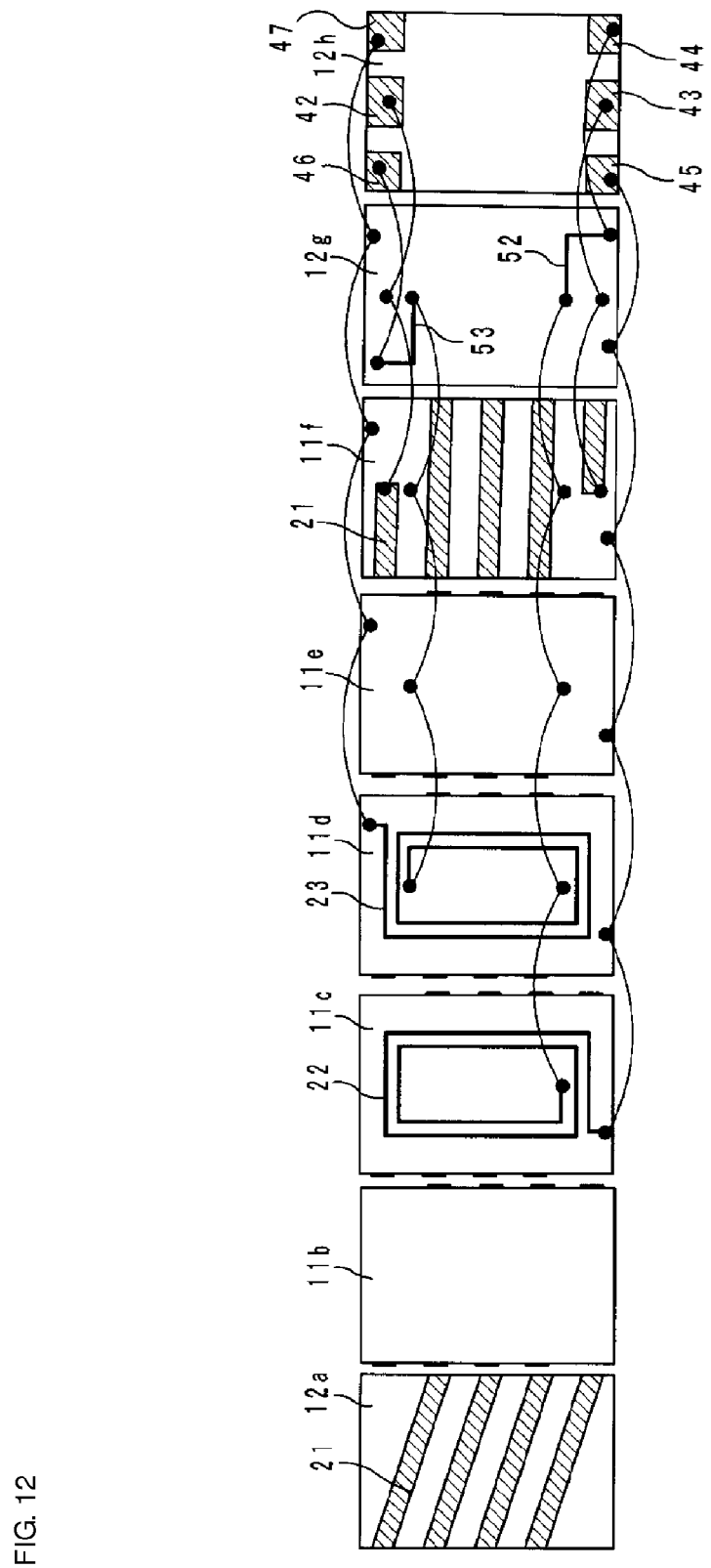
FIG. 12 is an exploded plan view of an antenna device according to a sixth preferred embodiment of the present invention, as seen from the undersurface (surface facing the mounting surface side) of each layer.

FIG. 12 is an exploded plan view of an antenna device according to a sixth preferred embodiment of the present invention, as seen from the undersurface (surface facing the mounting surface side) of each layer. A first coil conductor 21 is provided on the undersurface (top surface in FIG. 12) of a dielectric layer 12a, the undersurface (top surface in FIG. 12) of a magnetic layer 11f, and side surfaces of the magnetic layers 11b, 11c, 11d, and 11e. A second coil conductor 22 and a third coil conductor 23 are provided on a magnetic layer 11c and a magnetic layer 11d, respectively. External terminal electrodes 41 to 47 are provided on the undersurface of a dielectric layer 12h.

One end of the first coil conductor 21 is connected to the external terminal electrode 42 by a via-hole conductor, and the other end of the first coil conductor 21 is connected to the external terminal electrode 43 by a via-hole conductor. One end of the second coil conductor 22 is connected to the external terminal electrode 44 by a via-hole conductor and a wiring conductor 52, and the other end of the second coil conductor 22 is connected to the external terminal electrode 45 by a via-hole conductor. Likewise, one end of the third coil conductor 23 is connected to the external terminal electrode 46 by a via-hole conductor and a wiring conductor 53, and the other end of the third coil conductor 23 is connected to the external terminal electrode 47 by a via-hole conductor.

In this way, each of the first coil conductor, the second coil conductor, and the third coil conductor are independently connected to an external terminal electrode. Further, in this example, the respective coil opening surfaces of the second coil conductor and third coil conductor overlap each other (at least partially) in plan view as seen from the stacking direction of the multilayer body. Therefore, the coil defined by the second coil conductor and the coil defined by the third coil conductor are electromagnetically coupled to each other. That is, the coil defined by the second coil conductor and the coil defined by the third coil conductor define a transformer.

Seventh Preferred Embodiment

Figure 13:
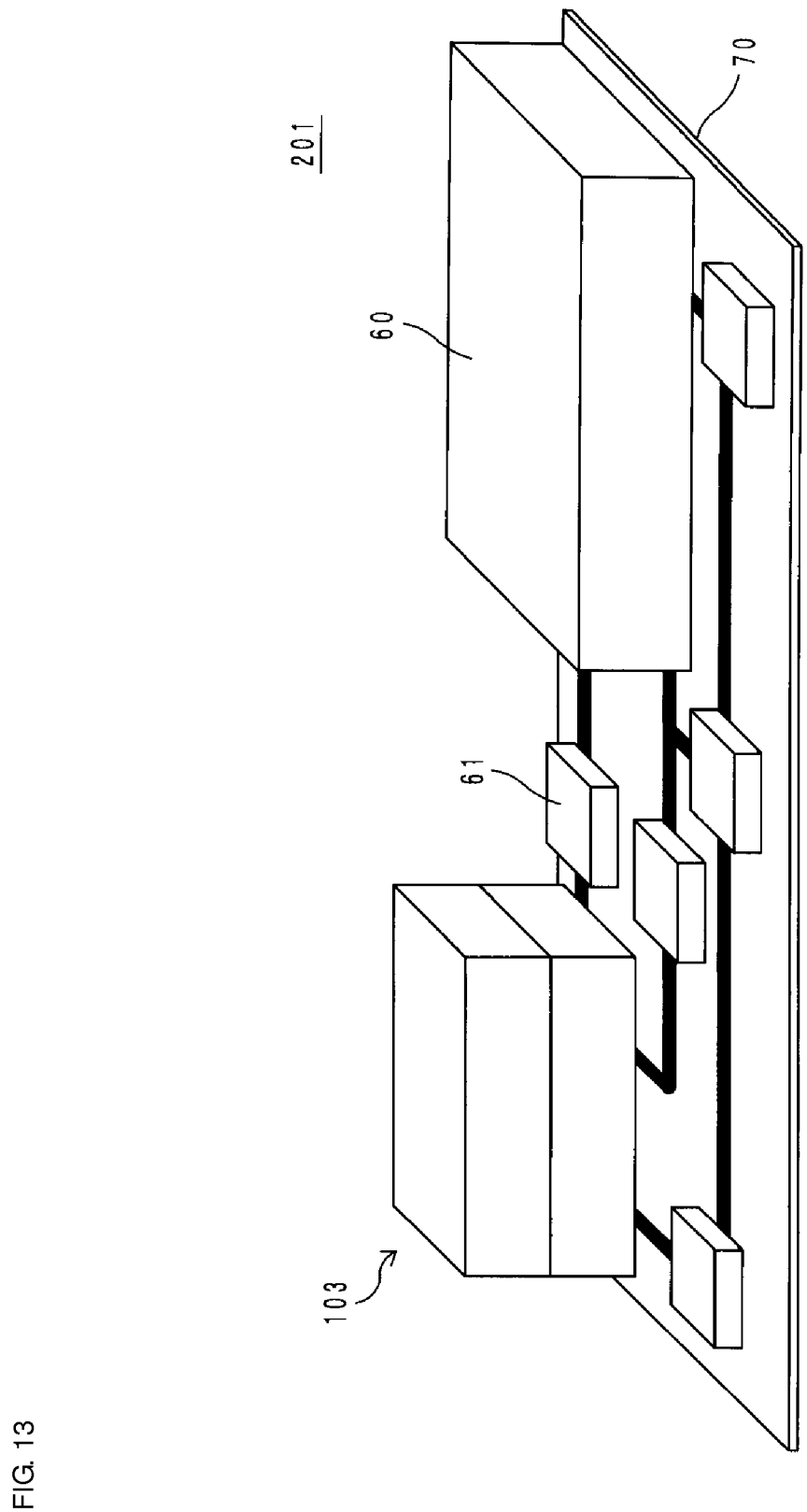
FIG. 13 is a perspective view of an RF module 201 according to a seventh preferred embodiment of the present invention.
Figure 26:
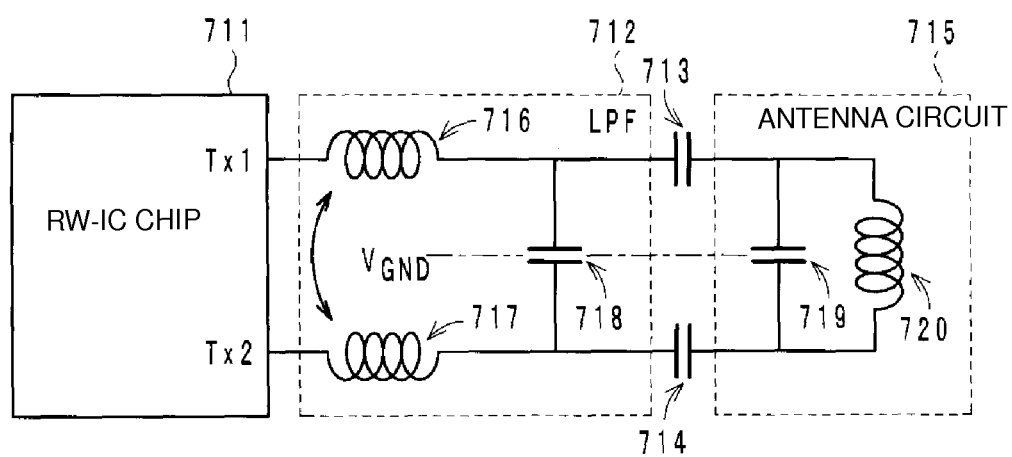
FIG. 26 schematically illustrates a circuit configuration of a reader/writer module (RW module).

FIG. 13 is a perspective view of an RF module 201 according to a seventh preferred embodiment of the present invention. This RF module includes a module substrate 70, an RFIC 60 mounted on this module substrate, an antenna device 103, and other chip components 61. The configuration of the antenna device 103 is as illustrated in FIG. 5. A matching circuit that provides impedance matching between the antenna device 103 and the RFIC 60, and an EMC filter as illustrated in FIG. 26 are preferably defined by the chip components and wiring on the module substrate 70. Because capacitors of the EMC filter and/or the impedance matching circuit are provided in the antenna device 103, the number of components to be mounted on the module substrate 70 is reduced, thus achieving miniaturization of the RF module.

Figure 14:
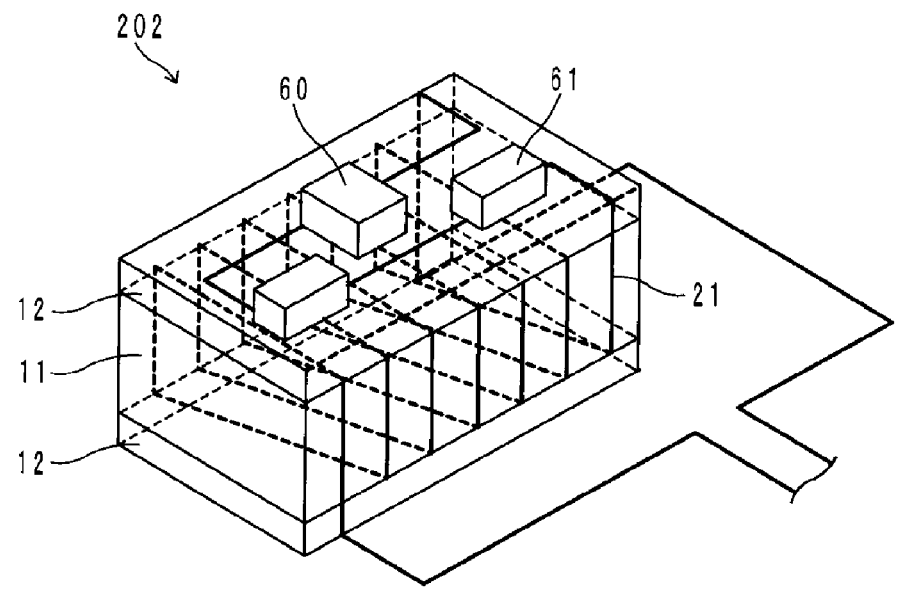
FIG. 14 is a perspective view of another RF module 202 according to the seventh preferred embodiment of the present invention.

FIG. 14 is a perspective view of another RF module 202 according to the seventh preferred embodiment of the present invention. The RF module 202 is provided in a multilayer body. The multilayer body includes a magnetic multilayer portion 11, and a dielectric multilayer portion 12 on top of and underneath the magnetic multilayer portion 11. A first coil conductor 21 extends around the magnetic multilayer portion 11. A second coil conductor is provided inside the magnetic multilayer portion 11. An RFIC 60 and other chip components 61 are located on the top surface of the multilayer body. A capacitor is provided in the dielectric multilayer portion 12 by capacitance-generating electrodes. An RF module can be also configured by a multilayer body in this way.

Eighth Preferred Embodiment

Figure 15:
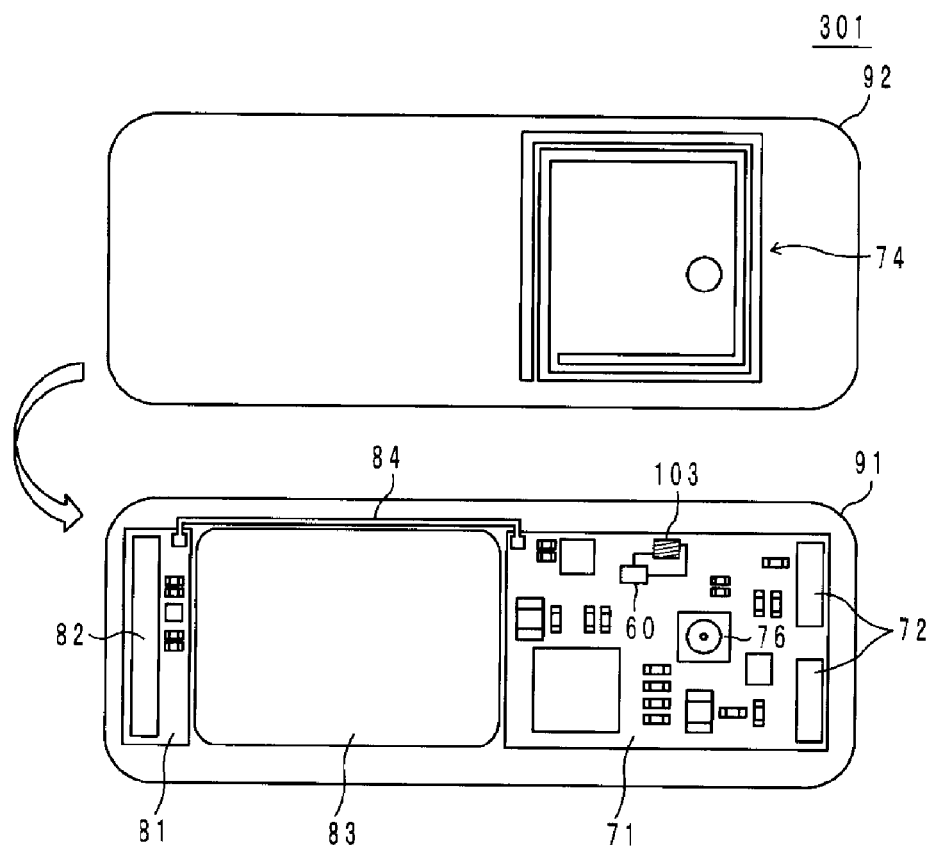
FIG. 15 illustrates the structure of the inside of the housing of a radio communication apparatus 301 according to an eighth preferred embodiment of the present invention, and is a plan view in a state where a lower housing 91 and an upper housing 92 are separated to expose the inside.

FIG. 15 illustrates the structure of the inside of the housing of a radio communication apparatus 301 according to an eighth preferred embodiment of the present invention, and is a plan view in a state where a lower housing 91 and an upper housing 92 are separated to expose the inside. Printed circuit boards 71 and 81, a battery pack 83, and the like are accommodated in the lower housing 91. An RFIC 60 including a communication circuit, and an antenna device 103 are mounted on the printed circuit board 71. A UHF antenna 72a, a camera module 76a, and the like are also installed on the printed circuit board 71. Further, a UHF antenna 82 and the like are installed on the printed circuit board 81. The printed circuit board 71 and the printed circuit board 81 are connected via a coaxial cable 84.

A booster coil antenna 74a is provided in the inner surface of the upper housing 92. The booster coil antenna 74a is magnetically coupled to the first coil conductor 21 (see FIG. 5) of the antenna device 103 to define and function as a magnetic-field antenna.

The booster coil antenna 74a includes an insulating sheet, and coil conductors located on its opposite surfaces. These two coil conductors are each preferably defined by a rectangular or substantially rectangular spiral pattern, and opposed to each other with the insulating sheet therebetween. The two coil conductors are configured in a pattern so as to capacitively couple to each other in a state in which current flows through the coil conductors in the same direction in plan view. The two coil conductors are configured in such a pattern that, in plan view as seen from the same direction, when current flows clockwise in one of the coil conductors, current flows also clockwise in the other coil conductor.

The first coil conductor of the antenna device 103 and the booster coil antenna 74a are disposed so as to be magnetic-field coupled to each other.

The first coil conductor provided in the multilayer body is preferably used as a feeder coil (antenna) in this way.

In the first to eighth preferred embodiments of the present invention described above, as illustrated in FIG. 2B, at least the first coil conductor 21 and the second coil conductor 22 preferably are arranged in the multilayer body 10 in such a way that their respective winding axes are perpendicular or substantially perpendicular to each other. This makes it possible to significantly reduce, minimize or substantially prevent a magnetic flux generated from the first coil conductor 21 from linking with a loop of current flowing through the second coil conductor 22. Likewise, it is possible to significantly reduce, minimize or substantially prevent a magnetic flux generated from the second coil conductor 22 from linking with a loop of current flowing through the first coil conductor 21. Therefore, even when the coil conductors 21 and 22 are integrated into the same multilayer body 10, magnetic-field coupling between the two conductors is significantly reduced, minimized or prevented. Consequently, it is possible to significantly reduce, minimize or prevent radiation unwanted harmonic components from the first coil conductor 21 through the second coil conductor 22, thus making it possible to provide a miniature antenna device with superior radio frequency characteristics.

Further, in the third to sixth preferred embodiments of the present invention, in particular, the multilayer body 10 is provided with the third coil conductor 23 having a winding axis extending perpendicular or substantially perpendicular to the winding axis of the first coil conductor 21, in addition to the first coil conductor 21 and the second coil conductor 22. This makes it possible to significantly reduce, minimize or prevent a magnetic flux generated from the third coil conductor 23 from linking with a loop of current flowing through the first coil conductor 21. Therefore, even when the coil conductors 21 and 23 are integrated into the same multilayer body 10, magnetic-field coupling between the two conductors is significantly reduced, minimized or prevented.

Figure 36:
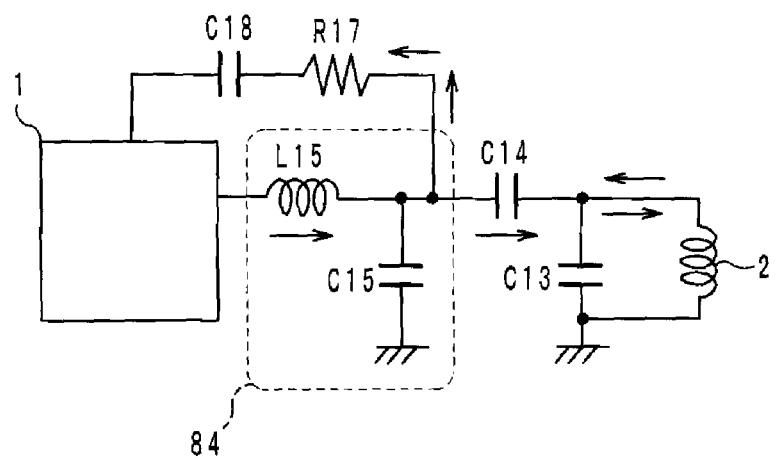
FIG. 36 schematically illustrates a transmitting/receiving circuit including an antenna device described in Japanese Patent No. 4798214.

There are the following additional technical effects. That is, in a case where the transmitting/receiving circuit illustrated in FIG. 36 is to be built as a module, the module is provided with a circuit configured to provide matching between the IC chip 1 and the antenna, an EMC filter circuit to remove harmonic components, and the like. This EMC filter is a filter used to prevent harmonic components generated in a power amplifier or the like from being radiated from an antenna and adversely affecting peripheral equipment. For this reason, the EMC filter is required to have low insertion loss in the pass band and large attenuation in the stop band. For example, in a case where the filter is to be defined by an LC filter, a multistage circuit configuration is also required. In order to mount these LC components on a module substrate, a substrate having a large area is required, which hinders miniaturization of the resulting portable terminal. However, the above preferred embodiments significantly reduce, minimize or prevent magnetic-field coupling between the plurality of coil conductors 21 and 22, for example, thus allowing these components to be integrated into the same multilayer body 10. As a result, it is possible to miniaturize the RF module 201 illustrated in FIG. 13, the RF module 202 illustrated in FIG. 14, the radio communication apparatus 301 illustrated in FIG. 15, and the like.

Ninth Preferred Embodiment

Figure 16:
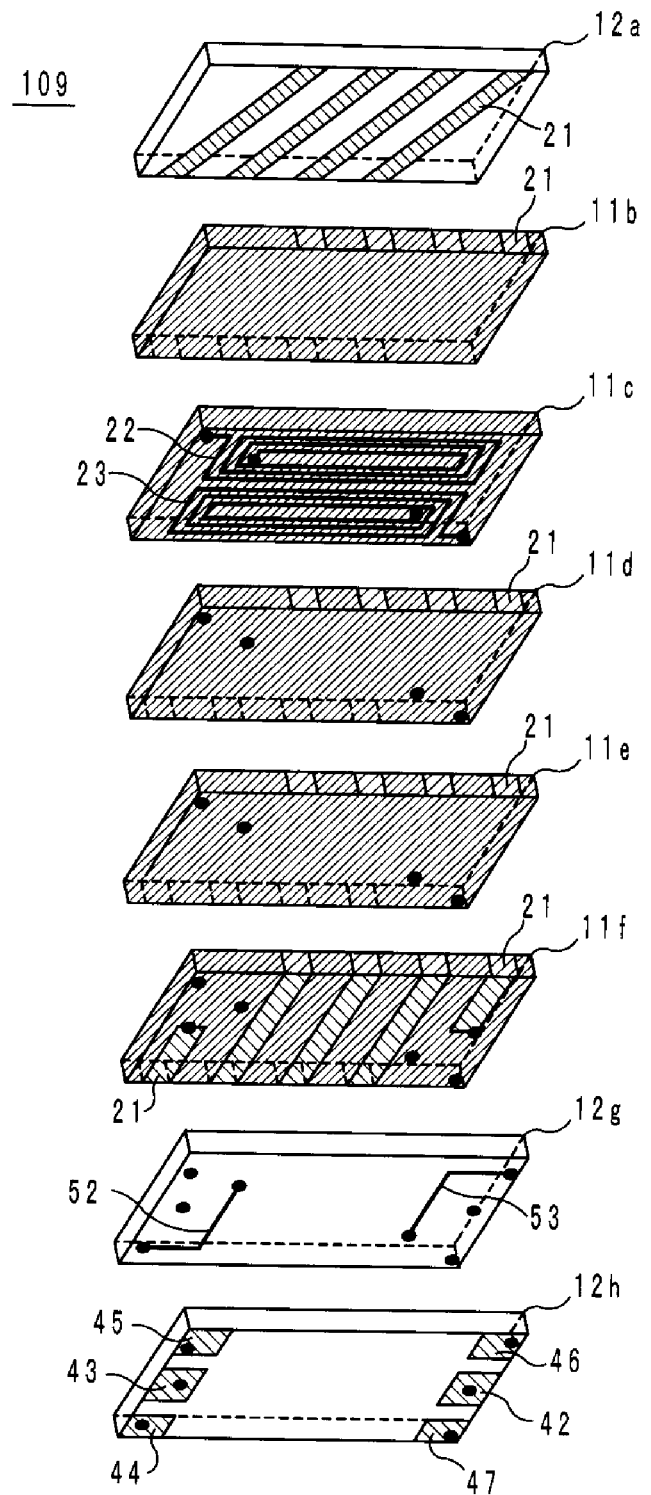
FIG. 16 is an exploded perspective view of an antenna device 109 according to a ninth preferred embodiment of the present invention.

FIG. 16 is an exploded perspective view of an antenna device 109 according to a ninth preferred embodiment of the present invention. The antenna device 109 is constructed in a multilayer body including a stack of a plurality of magnetic layers 11b, 11c, 11d, 11e, and 11f, and a plurality of dielectric layers 12a, 12g, and 12h. In FIG. 16, an outer coil conductor 21a is provided on the undersurface of the dielectric layer 12a, the undersurface of the magnetic layer 11f, and side surfaces of the magnetic layers 11b, 11c, 11d, 11e, and 11f. A first inner coil conductor 22c and a second inner coil conductor 23 are provided on the undersurface of the magnetic layer 11c. Wiring conductors 52 and 53 are provided on the undersurface of the dielectric layer 12g, and external terminal electrodes 42 to 47 are provided on the undersurface of the dielectric layer 12h.

Figure 17:
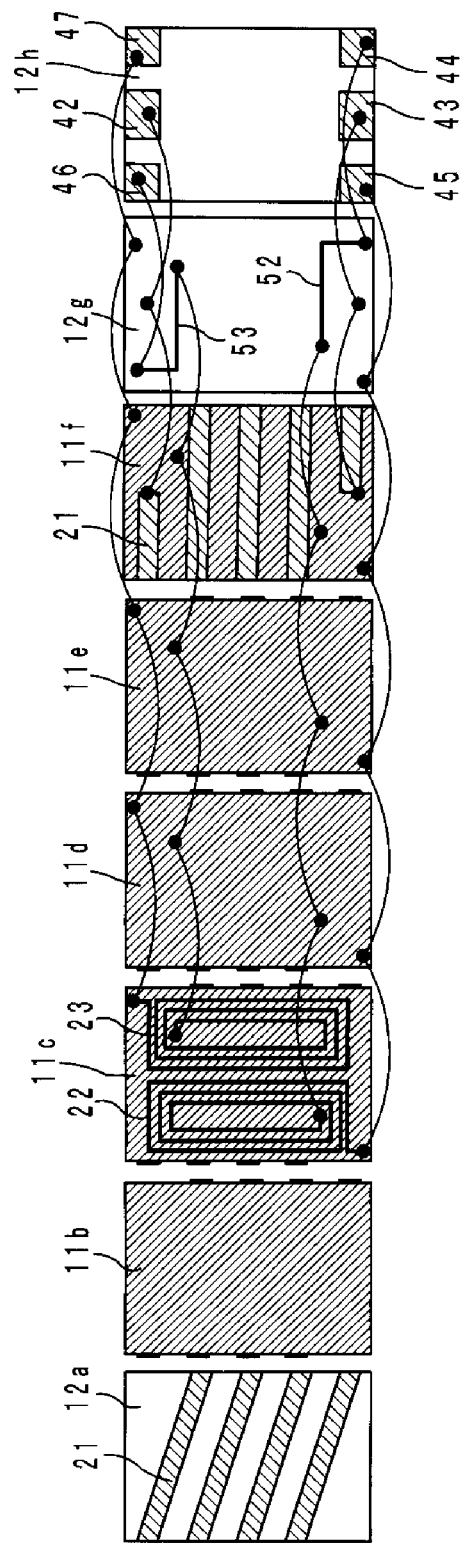
FIG. 17 is an exploded plan view illustrating conductor patterns provided on layers illustrated in FIG. 16 and how the conductor patterns are connected, as seen from the undersurface (surface facing the mounting surface side) of each of the layers.

FIG. 17 is an exploded plan view illustrating conductor patterns provided on the layers illustrated in FIG. 16 and how the conductor patterns are connected, as seen from the undersurface (surface facing the mounting surface side) of each of the layers. A first end of the outer coil conductor 21a is connected to the external terminal electrodes 42, and a second end of the outer coil conductor 21a is connected to the external terminal 43. A first end (inner peripheral end) of the first inner coil conductor 22c is connected to the external terminal 44 by a via-hole conductor and the wiring conductor 52, and a second end (outer peripheral end) of the first inner coil conductor 22c is connected to the external terminal 45 by a via-hole conductor. A first end (inner peripheral end) of the second inner coil conductor 23 is connected to the external terminal 46 by a via-hole conductor and the wiring conductor 53, and a second end (outer peripheral end) of the second inner coil conductor 23 is connected to the external terminal 47 by a via-hole conductor.

As in this preferred embodiment, two inner coil conductors 22 and 23 may be disposed so that the respective winding axes of the two inner coil conductors are aligned in a direction perpendicular or substantially perpendicular to the winding axis of the outer coil conductor.

Figure 18:
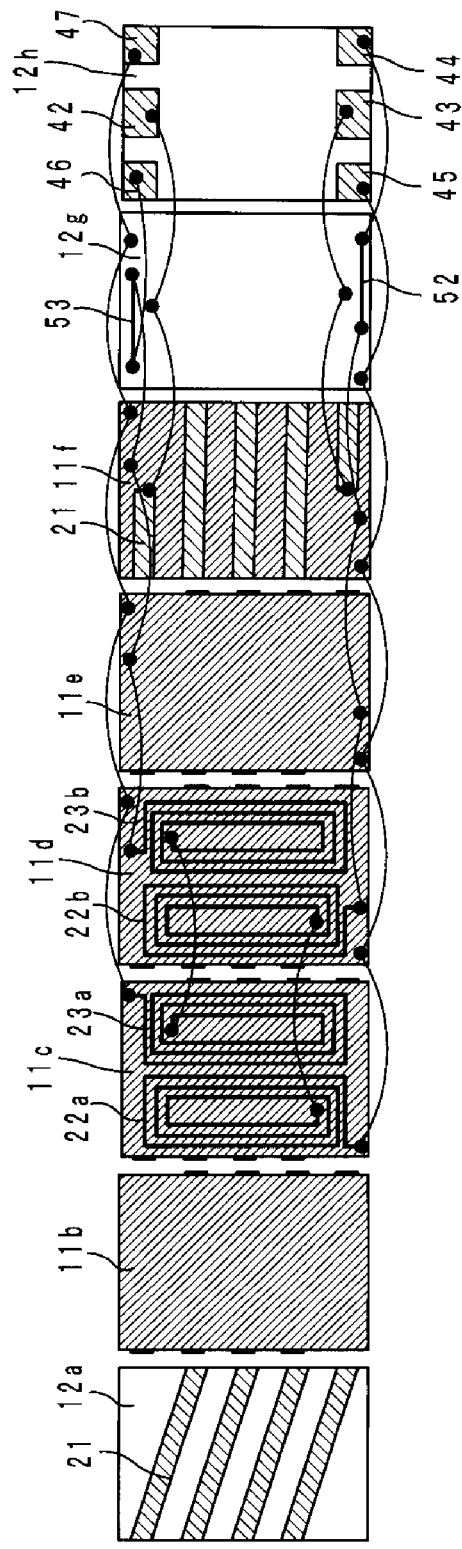
FIG. 18 is an exploded plan view illustrating conductor patterns provided on each layer of another antenna device according to the ninth preferred embodiment of the present invention, and how the conductor patterns are connected.

FIG. 18 is an exploded plan view illustrating conductor patterns provided on each layer of another antenna device according to the ninth preferred embodiment, and how the conductor patterns are connected. The difference from the example illustrated in FIG. 17 is that inner coil conductors preferably extend over two layers. That is, inner coil conductors 22a and 22b, and 23a and 23b are provided on the magnetic layers 11c and 11d. Otherwise, the antenna device is the same as the antenna device illustrated in FIG. 17.

Tenth Preferred Embodiment

Figure 19:
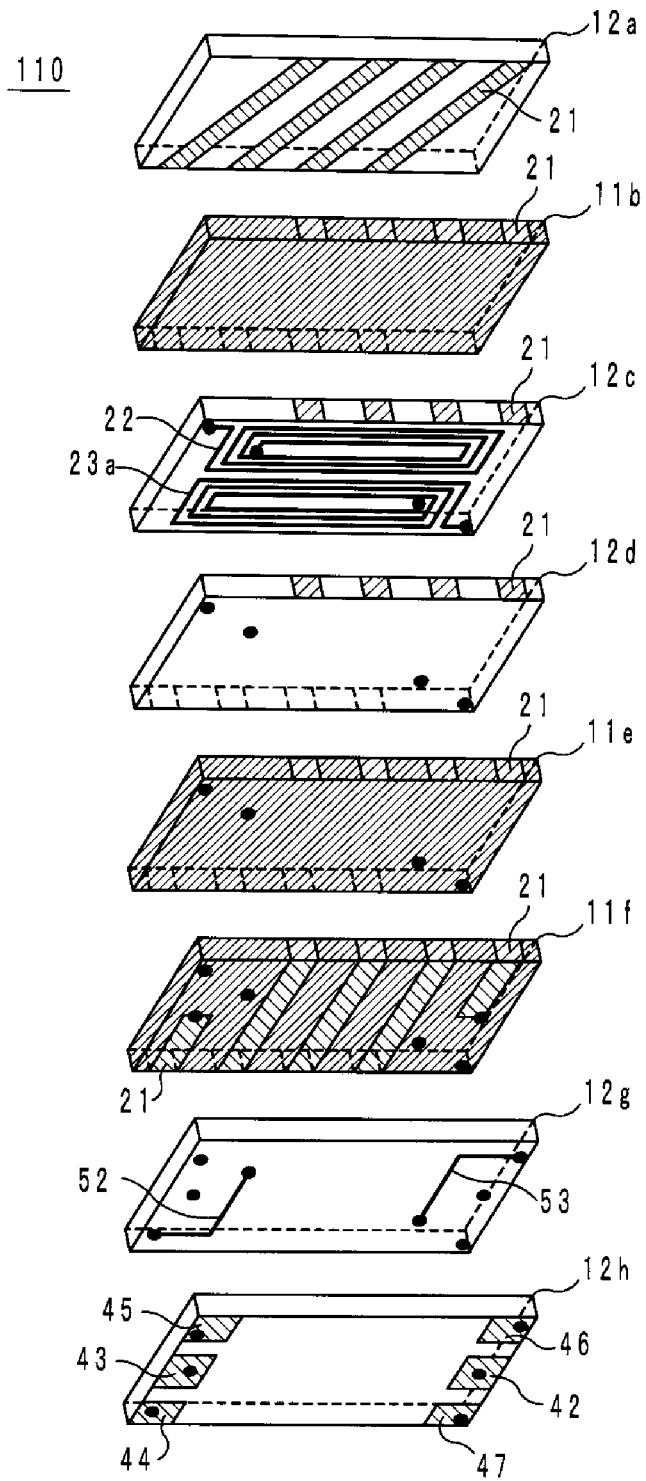
FIG. 19 is an exploded perspective view of an antenna device 110 according to a tenth preferred embodiment of the present invention.
Figure 20:
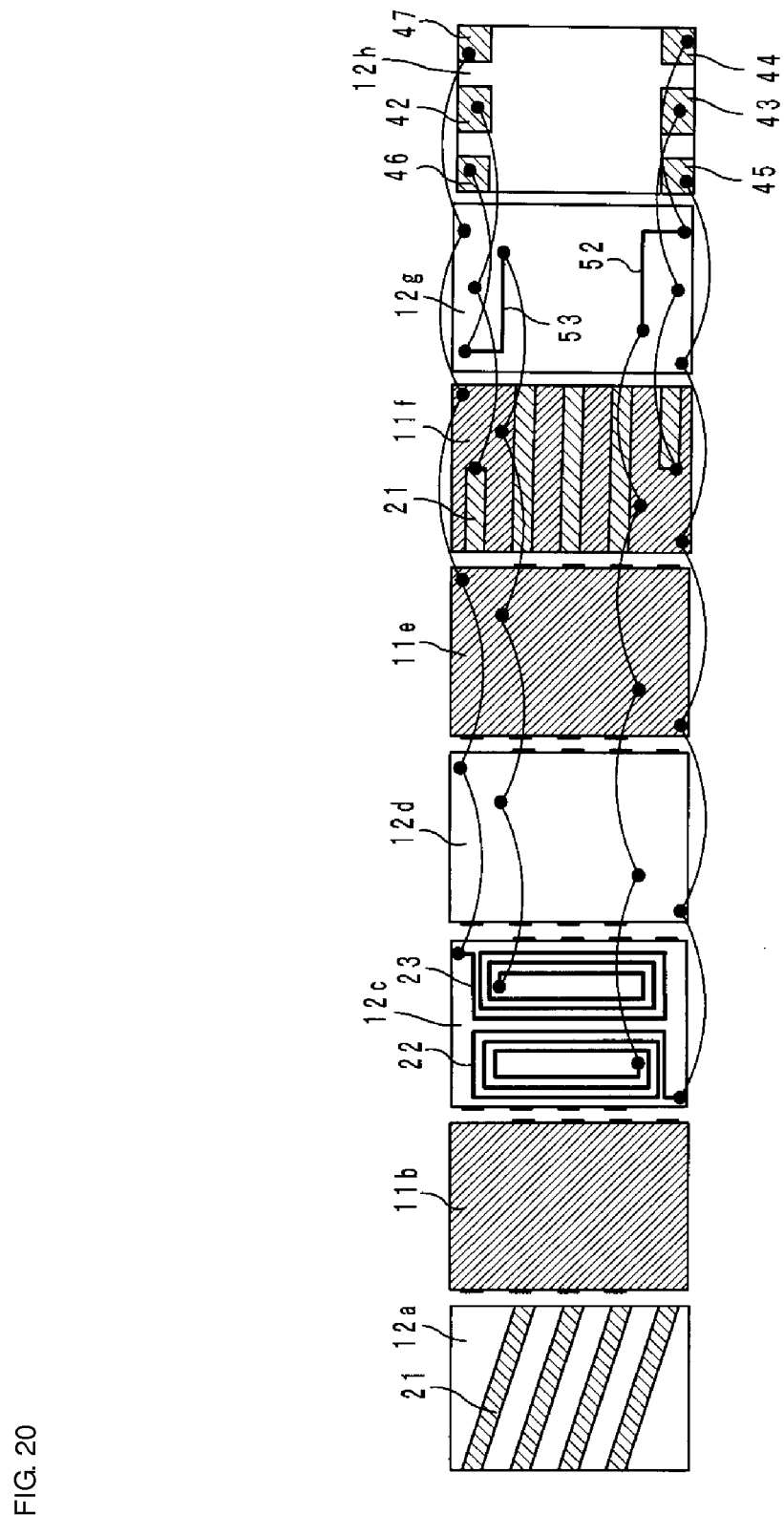
FIG. 20 is an exploded plan view illustrating conductor patterns provided on layers illustrated in FIG. 19 and how the conductor patterns are connected, as seen from the undersurface (surface facing the mounting surface side) of each of the layers.

FIG. 19 is an exploded perspective view of an antenna device 110 according to a tenth preferred embodiment of the present invention. FIG. 20 is an exploded plan view illustrating conductor patterns provided on layers illustrated in FIG. 19 and how the conductor patterns are connected, as seen from the undersurface (surface facing the mounting surface side) of each of the layers. Unlike the example illustrated in FIGS. 16 and 17, inner coil conductors 22 and 23 are provided on a dielectric layer 12c. A layer 12d in contact with the inner coil conductors 22 and 23 is also a dielectric layer.

In this way, the inner coil conductors 22 and 23 are provided on a layer that contacts a non-magnetic layer or in a magnetic layer. Therefore, unwanted coupling between the outer coil conductor 21a and the inner coil conductors 22 and 23 is further reduced, minimized or prevented.

Figure 21:
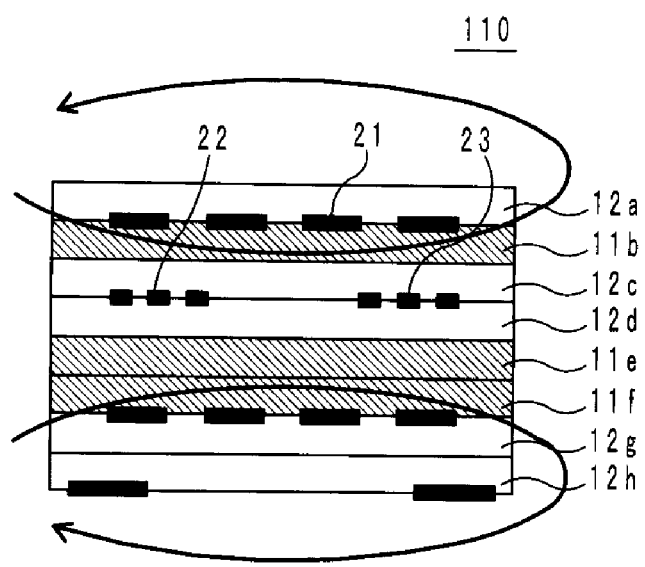
FIG. 21 conceptually illustrates the path of magnetic flux that links with an outer coil conductor of the antenna device 110.

FIG. 21 conceptually illustrates the path of magnetic flux that links with the outer coil conductor of the antenna device 110. As illustrated in FIG. 21, the magnetic flux generated from an outer coil conductor (antenna coil) 21 mainly passes through the vicinity of the outer coil conductor itself. Consequently, magnetic flux density in the central portion of the winding axis of the outer coil conductor is low. Accordingly, layers 11b, 11e, and 11f located near the outer coil conductor 21a are provided as magnetic layers, and layers 12c and 12d located in the vicinity of the inner coil conductors 22 and 23 are provided as dielectric layers (non-magnetic layers). As a result, unwanted coupling between the outer coil conductor 21a and the inner coil conductors 22 and 23 is further reduced, minimized or prevented.

In the example illustrated in FIG. 21, the two layers sandwiching the inner coil conductors 22 and 23 are both dielectric layers (non-magnetic layers). However, the above-mentioned effect can be obtained to some extent even if only one of layers in contact with the inner coil conductors 22 and 23 is a dielectric layer (non-magnetic layer).

Eleventh Preferred Embodiment

Figure 22:
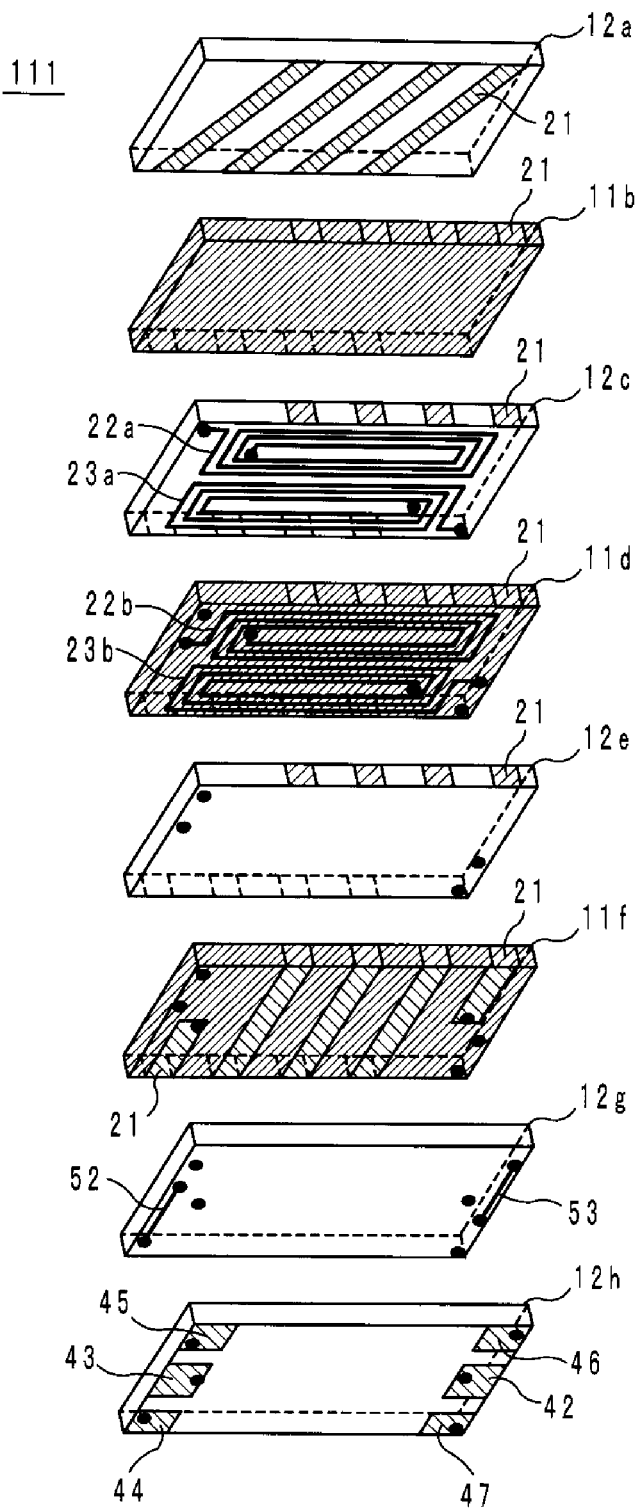
FIG. 22 is an exploded perspective view of an antenna device 111 according to an eleventh preferred embodiment of the present invention.
Figure 23:
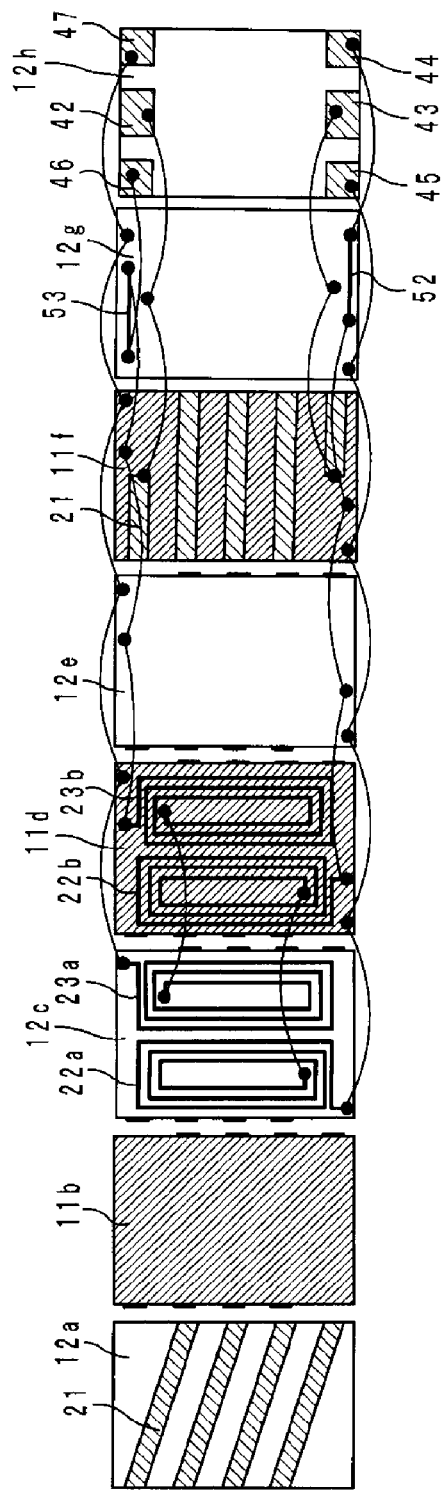
FIG. 23 is an exploded plan view illustrating conductor patterns provided on layers illustrated in FIG. 22 and how the conductor patterns are connected, as seen from the undersurface (surface facing the mounting surface side) of each of the layers.

FIG. 22 is an exploded perspective view of an antenna device 111 according to an eleventh preferred embodiment of the present invention. FIG. 23 is an exploded plan view illustrating conductor patterns provided on layers illustrated in FIG. 22 and how the conductor patterns are connected, as seen from the undersurface (surface facing the mounting surface side) of each of the layers. Unlike the example illustrated in FIG. 18, inner coil conductors 22a and 22b are provided on a dielectric layer 12c. Further, a layer 12e with which inner coil conductors 22b and 23b contact is a dielectric layer.

In a case where the inner coil conductors are provided on a plurality of layers of the multilayer body in this way, the outer coil conductor 21a is provided on a magnetic layer 11f, and in a layer that contacts a magnetic layer 11b, and a magnetic layer 11d is disposed between those inner coil conductors which are provided on different layers. As a result, the inductance of each of the inner coil conductors 22a, 22b, 23a, and 23b is increased while significantly reducing, minimizing or preventing unwanted coupling between the outer coil conductor 21a and the inner coil conductors 22a, 22b, 23a, and 23b.

Twelfth Preferred Embodiment

Figure 24:
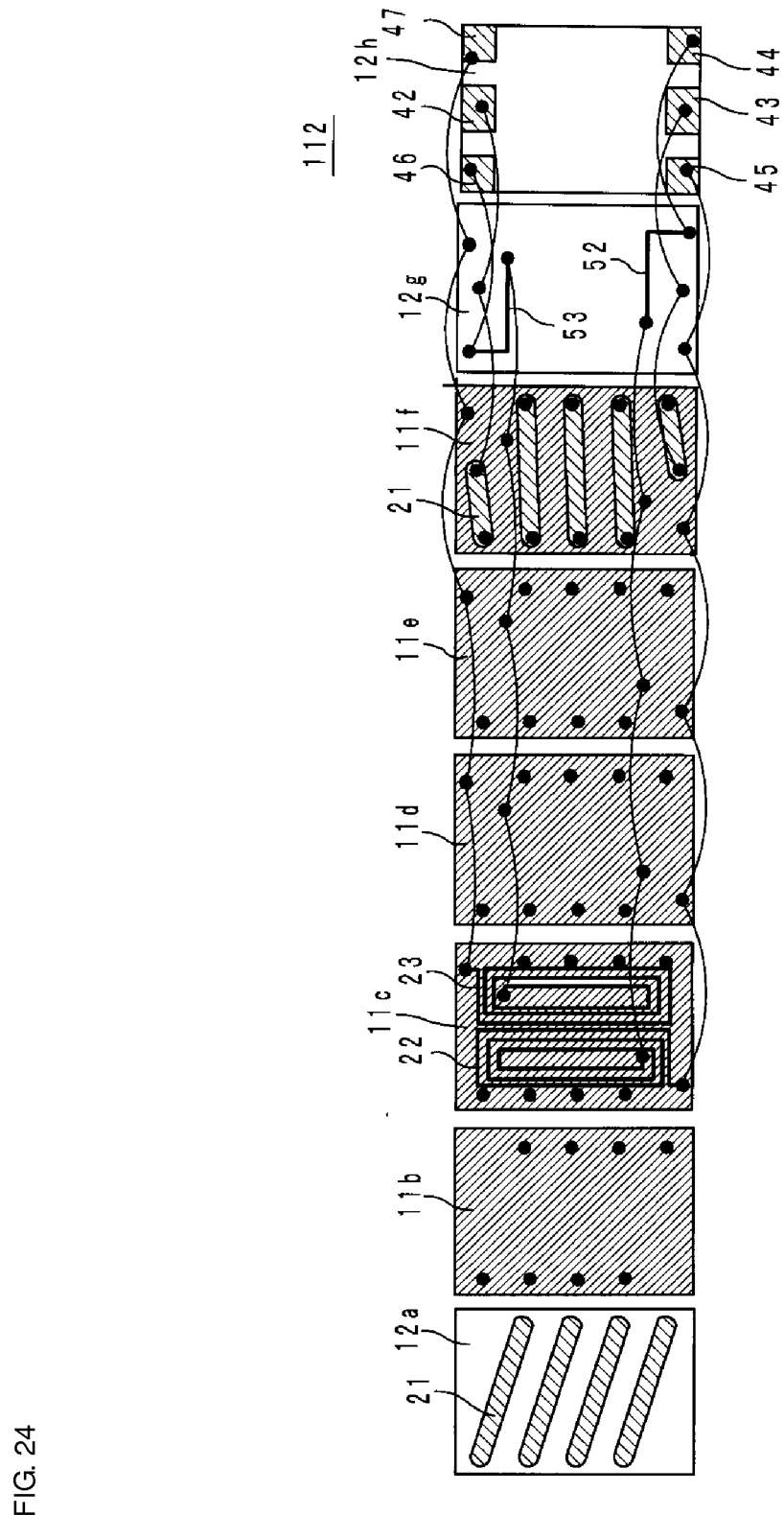
FIG. 24 is an exploded plan view illustrating conductor patterns provided on each layer of an antenna device according to a twelfth preferred embodiment of the present invention and how the conductor patterns are connected, as seen from the undersurface (surface facing the mounting surface side) of each of the layers.

FIG. 24 is an exploded plan view illustrating conductor patterns provided on each layer of an antenna device according to a twelfth preferred embodiment of the present invention and how the conductor patterns are connected, as seen from the undersurface (surface facing the mounting surface side) of each of the layers. An outer coil conductor 21a is defined by via electrodes formed in a dielectric layer 12a, and magnetic layers 11b to 11e. While a portion of the outer coil conductor is provided on the side surface (end surface) of each layer in the example illustrated in FIG. 17, the outer coil conductor may not be exposed to the side surface (end surface) of each layer as illustrated in FIG. 24.

This configuration significantly reduces, minimizes or prevents unwanted magnetic field radiation by the outer coil conductor 21a in the direction of the outer periphery around the coil winding axis, thus significantly reducing, minimizing or preventing unwanted coupling with neighboring mounting components or a metal housing.

Figure 25A:
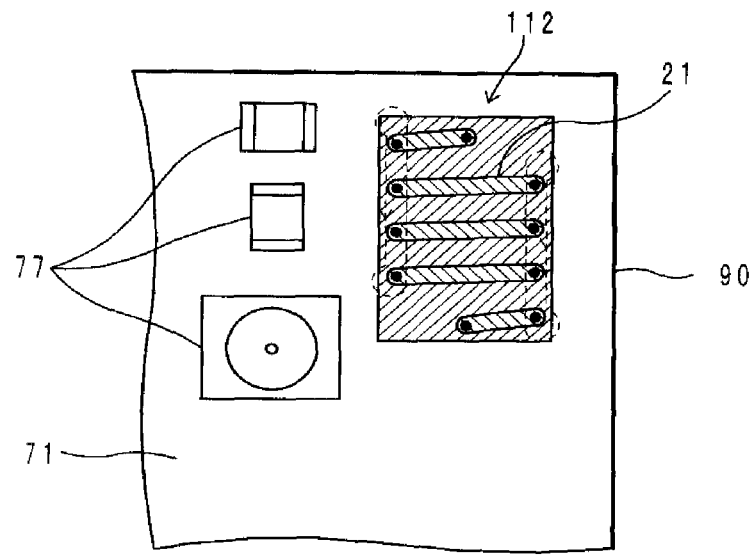
FIG. 25A illustrates how unwanted coupling between an outer coil conductor 21a and neighboring mounting components or a metal housing is significantly reduced, minimized or prevented according to the twelfth preferred embodiment of the present invention.
Figure 25B:
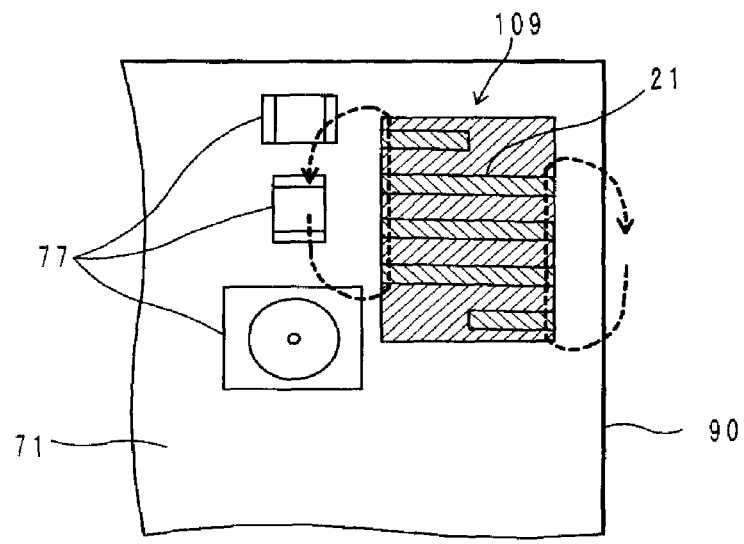
FIG. 25B illustrates how unwanted coupling between the outer coil conductor 21a and the neighboring mounting components or the metal housing is significantly reduced, minimized or prevented according to the ninth preferred embodiment of the present invention.

FIGS. 25A and 25B illustrate the effect mentioned above. FIG. 25A is a partial plan view of the inside of an electronic apparatus such as a cellular phone terminal which includes an antenna device 112 according to the twelfth preferred embodiment of the present invention. FIG. 25B is a partial plan view of the inside of an electronic apparatus such as a cellular phone terminal which includes the antenna device 109 according to the ninth preferred embodiment of the present invention. In each of FIGS. 25A and 25B, the broken lines schematically indicate magnetic flux generated by the outer coil conductor 21a.

In the antenna device 109, the outer coil conductor is exposed to the side surface (end surface) of each layer of the antenna device 109. Consequently, the magnetic field is radiated to the lateral side of the antenna device 112, causing unwanted coupling of this magnetic field with mounting components 77a on a board 71 or a metal housing 90. To the contrary, in the antenna device 112, the outer coil conductor is not exposed to the side surface (end surface) of each layer of the antenna device 112. Consequently, the magnetic field that is otherwise radiated to the lateral side of the antenna device 112 becomes confined, with the result that the above-mentioned unwanted coupling hardly occurs. Therefore, a decrease in the gain of the antenna device, or problems due to interference with other elements are prevented.

With reference to FIG. 26, the basic circuit configuration of a reader/writer module as an example of antenna device will be described. In FIG. 26, the reader/writer module (hereinafter, referred to as "RW module") preferably conforms to a radio communication standard such as NFC. When, for example, an RFID tag or contactless IC card is brought into close proximity to the RW module, the RW module performs radio communication with the RFID tag or the like. To this end, the RW module includes an RW-IC chip 711, a low pass filter (hereinafter, referred to as "LPF") 712, first and second capacitor elements 713 and 714, and an antenna circuit 715.

The RW-IC chip 711 includes balanced output terminals Tx1 and TX2. In the RW-IC chip 711, a baseband signal to be transmitted to the communicating party of this RW module is converted into a transmitting signal (positive-phase signal) in a predetermined radio frequency band (for example, the 13 MHz band), in accordance with a predetermined digital modulation scheme. Further, in the RW-IC chip 711, an opposite-phase signal with a phase rotated by 180° with respect to the positive-phase signal is also generated. The positive-phase signal and the opposite-phase signal define a differential signal. The differential signal is outputted from the RW-IC chip 711 to the LPF 712. Specifically, the positive-phase signal is outputted from one output terminal Tx1, and supplied to a first inductor element 716 included in the LPF 712, and the opposite-phase signal is outputted from the other output terminal Tx2, and supplied to a second inductor element 717 included in the LPF 712.

The RW-IC chip 711 defines and functions as a feeder circuit that transmits a predetermined radio frequency signal to an antenna coil 720 of the antenna circuit 715, or that processes a radio frequency signal received via the antenna circuit 715, and is also capable of converting a signal received by the antenna circuit 715 into a baseband signal in accordance with the digital modulation scheme mentioned above.

The LPF 712 passes only low frequency components lower than or equal to a predetermined frequency from the differential signal outputted from the RW-IC chip 711, and outputs the low frequency components to the antenna circuit 715. As a result, unwanted harmonic components are removed, and radiation of harmonic components from the antenna circuit 715 is significantly reduced, minimized or prevented. In order to remove harmonic components, in the example illustrated in FIG. 26, the LPF 712 includes the first and second inductor elements 716 and 717, and a capacitor element 718. The first inductor element 716 is connected in series between one output terminal Tx1 of the RW-IC chip 711, and one terminal electrode of the first capacitor element 713. Further, the second inductor element 717 is connected in series between the other output terminal Tx2, and one terminal electrode of the second capacitor element 714. The capacitor element 718 is electrically connected between the respective output terminal electrodes of the first and second inductor elements 716 and 717.

In the LPF 712, the first and second inductor elements 716 and 717 define a common-mode choke configured to remove common-mode noise that can become superimposed on the positive-phase signal and the opposite-phase signal. For this reason, the first and second inductor elements 716 and 717 are wound the same number of turns in opposite directions. Further, the first and second inductor elements 716 and 717 are located so as to be symmetric to each other with respect to the midpoint in terms of electric potential, that is, an imaginary ground $V_{GND}$. In the LPF 712, the midpoint in terms of electric potential is defined by the capacitor element 718.

The first and second capacitor elements 713 and 714 cut direct-current components included in an output positive-phase signal and an output opposite-phase signal from the LPF 712, and output the resulting signals to the antenna circuit 715.

The antenna circuit 715 is a parallel resonant circuit including a tuning capacitor element 719 and the antenna coil 720. An output positive-phase signal from the first capacitor element 713 is inputted to one terminal electrode of this parallel resonant circuit, and an output opposite-phase signal from the second capacitor element 714 is inputted to the other terminal electrode. The tuning capacitor element 719 is defined by a ceramic multilayer capacitor element having a fixed capacitance value, or a variable-capacitance capacitor element. The antenna coil 720 is defined by, for example, a multilayer coil or thin film coil having a fixed inductance value.

In a case where the RW module conforms to NFC, the values of individual elements of the antenna circuit 715 are designed so as to resonate at a frequency in the 13 MHz band, for example. Consequently, from the antenna coil 720, a radio frequency signal in the 13 MHz band is radiated toward an antenna coil (not illustrated) on the communicating party side. As a result, magnetic-field coupling occurs between the antenna coil 720 and the antenna coil on the communicating party side, and the radiated radio frequency signal is received by the communicating party.

Thirteenth Preferred Embodiment

Figure 27:
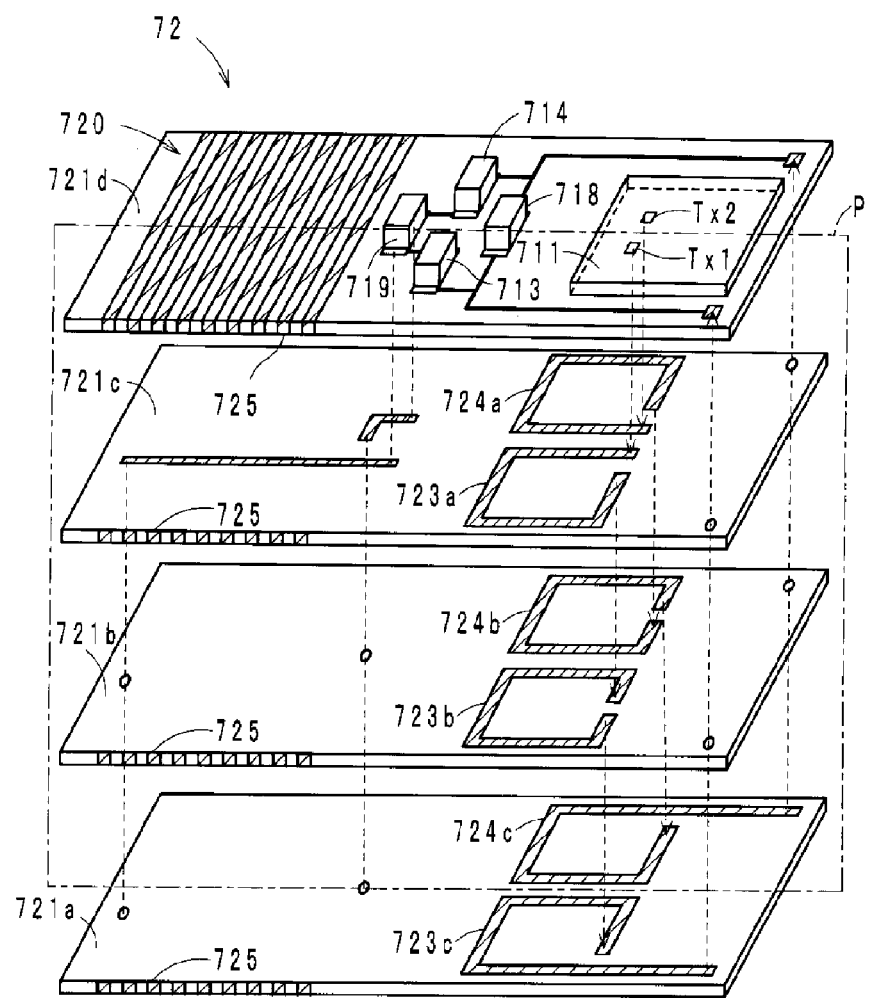
FIG. 27 is a perspective view, exploded for each base material layer, of an RW module according to a thirteenth preferred embodiment of the present invention.
Figure 27:
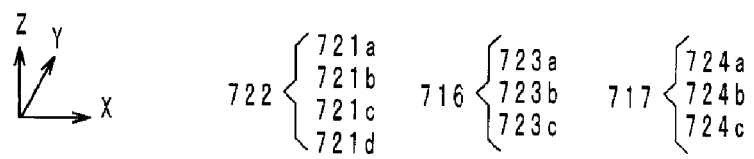
Figure 28:
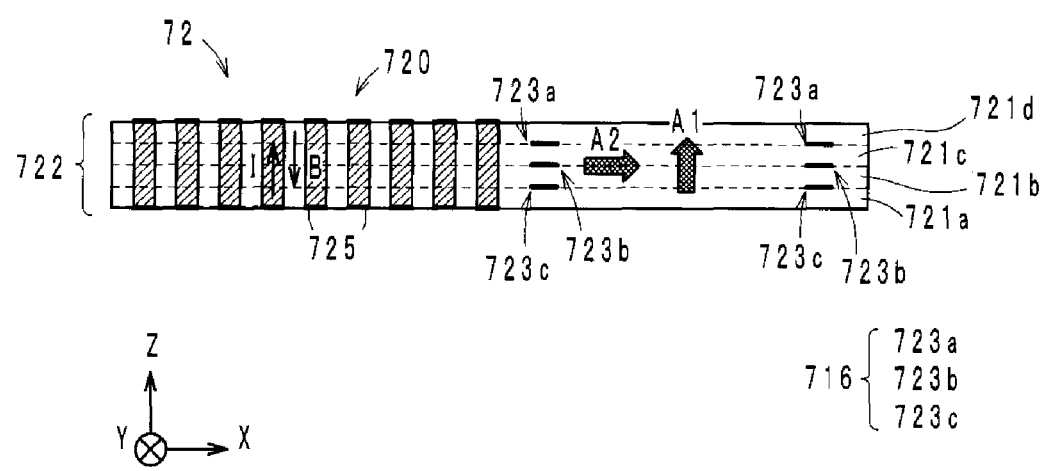
FIG. 28 schematically illustrates an antenna coil and first and second inductor elements as seen from the side of the RW module illustrated in FIG. 27.

Next, with reference to FIGS. 27 and 28, an RW module 72 according to a thirteenth preferred embodiment of the present invention will be described. In FIGS. 27 and 28, components corresponding to those in FIG. 26 are denoted by the same reference signs. The X-axis, the Y-axis, and the Z-axis are axes perpendicular or substantially perpendicular to each other. The Z-axis, in particular, is parallel or substantially parallel to the direction in which base material layers 721a to 721d described later are stacked. For the convenience of explanation, it is assumed that the Z-axis represents the top-bottom direction of the RW module 72. Further, the X-axis is parallel or substantially parallel to the top surfaces of the base material layers 721a to 721d. For the convenience of explanation, it is assumed that the X-axis represents the left-right direction of the RW module 72.

The RW module 72 includes, first, a multilayer body 722 having a rectangular or substantially rectangular parallelepiped shape, first and second inductor elements 716 and 717, and an antenna coil 720. The multilayer body 722 is a stack of four base material layers 721a to 721d as an example of a plurality of base material layers.

The base material layers 721a to 721d are stacked in this order along the Z-axis direction. The base material layers 721a to 721d preferably are sheet-shaped members that are made of a magnetic material (for example, ferrite) having a relatively high permeability (for example, $\mu=100$), and have the same or substantially the same rectangular or substantially rectangular shape. Now, a plane (indicated by alternate long and short dash lines) bisecting the base material layers 721a to 721d perpendicularly or substantially perpendicularly to the Y-axis is defined as center plane P.

In a preferred example, an RW-IC chip 711 is mounted on the top surface of the multilayer body 722. Specifically, the RW-IC chip 711 includes output terminals Tx1 and Tx2 each defined by a metal conductor. The output terminals Tx1 and Tx2 are spaced from each other on the bottom surface of the RW-IC chip 711. Further, the base material layer 721d includes two vias provided at positions that are symmetric to each other with respect to the center plane P. The RW-IC chip 711 is mounted on the top surface of the multilayer body 722 (that is, the top surface of the base layer 721d) by using these vias and the output terminals Tx1 and Tx2. Because denoting the vias by reference signs renders the figures hard to see, reference signs are not given to the vias.

The first and second inductor elements 716 and 717 preferably have shapes that are symmetric to each other with respect to the center plane P. The first and second inductor elements 716 and 717 are each an example of second coil conductor. The first and second inductor elements 716 and 717 include a plurality of first coil patterns 723a to 723c and 724a to 724c defined by metal conductors, respectively. Since the first coil patterns 724a to 724c are symmetric in shape to the first coil patterns 723a to 723c, respectively, their description is omitted.

The first coil patterns 723a, 723b, and 723c are provided on the top surfaces of the base material layers 721c, 721b, and 721a, respectively. The first coil patterns 723a, 723b, and 723c each include a loop conductor that is oriented counterclockwise about a winding axis A1 (see FIG. 28) that is parallel or substantially parallel to the Z-axis. One end of the first coil pattern 723a is connected to the output terminal Tx1 through a via in the base material layer 721d as illustrated in FIG. 27, and the other end of the first coil pattern 723a is connected to one end of the first coil pattern 723b through a via in the base material layer 721c. The other end of the first coil pattern 723b is connected to one end of the first coil pattern 723c through a via in the base material layer 721b. The other end of the first coil pattern 723c is connected to one electrode of each of capacitor elements 713 and 718 described later through vias in the base material layers 721a to 721d and electrode conductors.

Preferably, the RW-IC chip 711 is mounted above the first and second inductor elements 716 and 717. As a result, the multilayer body 722 is significantly reduced in size or miniaturized.

The antenna coil 720 is an example of first coil conductor, and includes second coil patterns 725 provided on the base material layers 721a to 721d. Specifically, the second coil patterns 725 are defined by metal conductors. The second coil patterns 725 are wound by using the surface (more specifically, the top surface, the bottom surface, and two side surfaces opposite to each other in the Y-axis direction) of the multilayer body 722, in such a way that a winding axis A2 (see FIG. 28) of the antenna coil 720 is perpendicular or substantially perpendicular to the winding axis A1. Instead of being metal conductors provided on two side surfaces opposite to each other in the Y-axis direction, the second coil patterns 725 may be divided via-hole conductors or through-hole conductors, or may be printed conductor patterns.

Preferably, in addition to the RW-IC chip 711, first and second capacitor elements 713 and 714, the capacitor element 718, and a tuning capacitor element 719 are mounted on the top surface of the multilayer body 722. The first and second capacitor elements 713 and 714 are disposed so as to be symmetric to each other with respect to the center plane P. The capacitor element 718 and the tuning capacitor element 719 each include one electrode and the other electrode, and are disposed so that the one electrode and the other electrode are symmetric to each other with respect to the center plane P.

The capacitor elements 713, 714, 718, and 719 are connected as illustrated in FIG. 26. One electrode of each of the capacitor elements 713 and 718 is connected to the other end of the first coil pattern 723c, and the other electrode of each of the capacitor elements 714 and 718 is connected to the other end of the first coil pattern 724c. As illustrated in FIG.

27, one electrode and the other electrode of the tuning capacitor element 719 are connected to one end and the other end of the antenna coil 720, through vias in the base material layers 721a to 721d and conductor patterns provided on the base material layer 721c.

Mounting electronic components such as the RW-IC chip 711 on the top surface of the multilayer body 722 in this way is preferred also from the viewpoint of space saving because there is no need to secure a space to mount these electronic components in other portions.

Fourteenth Preferred Embodiment

Figure 29:
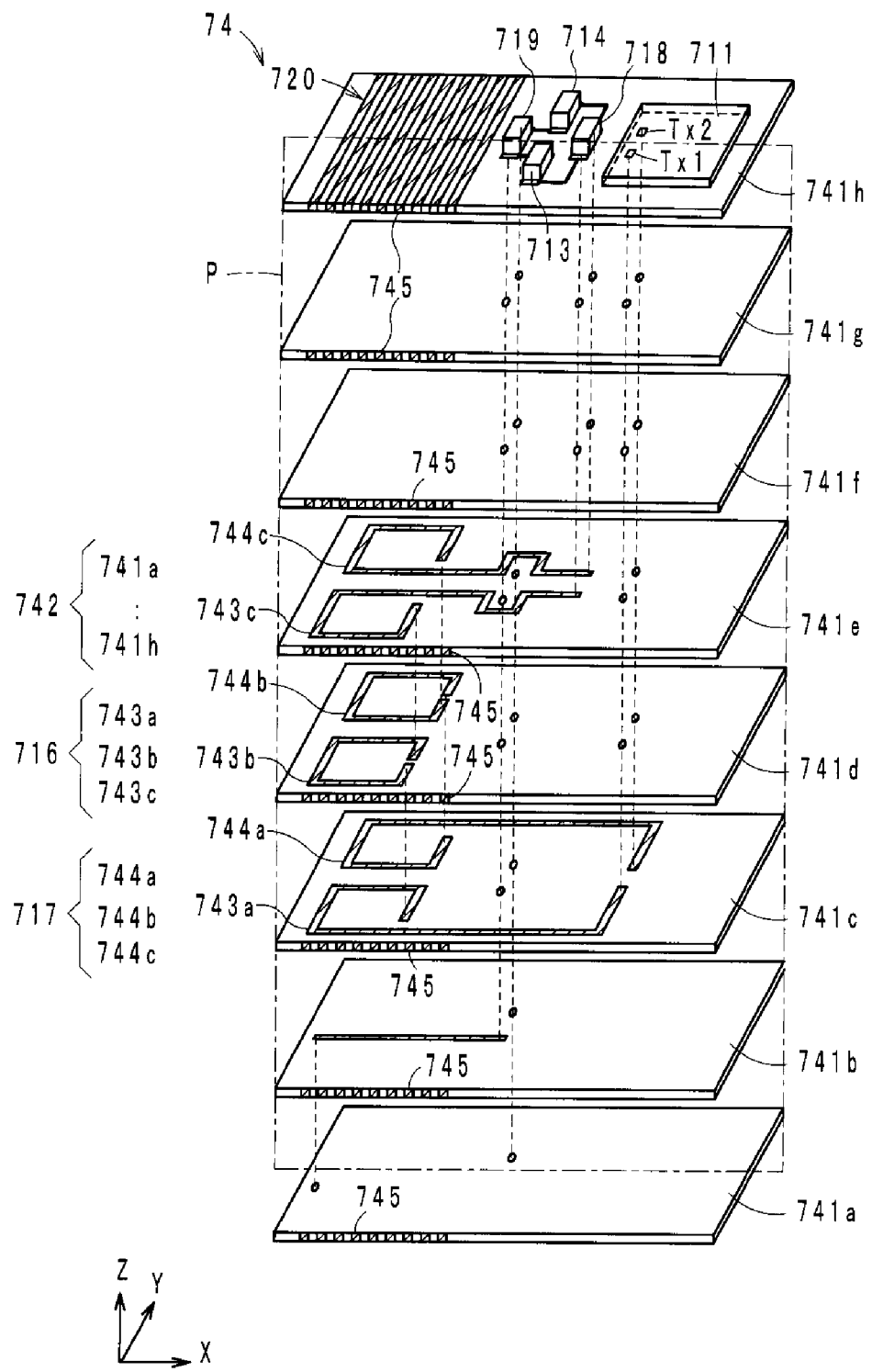
FIG. 29 is a perspective view, exploded for each base material layer, of an RW module according to a fourteenth preferred embodiment of the present invention.
Figure 30:
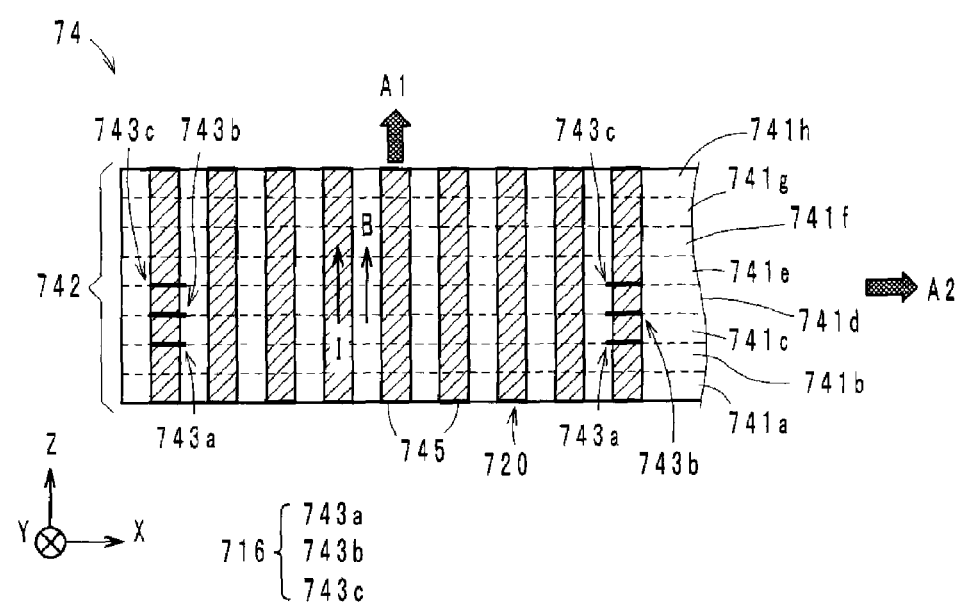
FIG. 30 schematically illustrates an antenna coil and first and second inductor elements as seen from the side of the RW module illustrated in FIG. 29.

Next, with reference to FIGS. 29 and 30, an RW module 74 according to a fourteenth preferred embodiment of the present invention will be described. In FIGS. 29 and 30, components corresponding to those in FIGS. 26 to 28 are denoted by the same reference signs. Further, the X-axis, the Y-axis, and the Z-axis are as defined above with reference to the thirteenth preferred embodiment of the present invention.

The RW module 74 includes a multilayer body 742 having a rectangular or substantially rectangular parallelepiped shape, first and second inductor elements 716 and 717, and an antenna coil 720. The multilayer body 742 preferably includes a stack of eight base material layers 741a to 741h as an example of a plurality of base material layers.

The base material layers 741a to 741h are stacked in this order along the Z-axis direction. The material and shape of each of the base material layers 741a to 741h are the same as those of the base material layer 721a and the like mentioned above. Further, in this preferred embodiment, a center plane P is a plane (indicated by alternate long and short dash lines) bisecting the base material layers 741a and the like perpendicularly to the Y-axis.

As in the thirteenth preferred embodiment of the present invention, an RW-IC chip 711, first and second capacitor elements 713 and 714, a capacitor element 718, and a tuning capacitor element 719 are mounted on the top surface of the base material layer 741h.

The first and second inductor elements 716 and 717 include a plurality of first coil patterns 743a to 743c and a plurality of first coil patterns 744a to 744c, respectively, which are symmetric in shape with respect to the center plane P, and defined by metal conductors. As in the thirteenth preferred embodiment of the present invention, also in this preferred embodiment, only the first coil patterns 743a to 743c defining the first inductor element 716 will be described in detail.

The first coil patterns 743a, 743b, and 743c are provided on the top surfaces of the base material layers 741c, 741d, and 741e, respectively. The first coil patterns 743a to 743c each include a loop conductor that is counterclockwise about a winding axis A1 (see FIG. 30) that is parallel or substantially parallel to the Z-axis.

As illustrated in FIG. 29, one end of the first coil pattern 743a is connected at one end to an output terminal Tx1 through vias formed in the base material layers 741d to 741h. The other end of the first coil pattern 743a is connected to one end of the first coil pattern 743b through a via in the base material layer 741d. The other end of the first coil pattern 743b is connected to one end of the first coil pattern 743c through a via in the base material layer 741e. The other end of the first coil pattern 743c is connected to one electrode of the capacitor element 718 through vias formed in the base material layers 741f to 741h.

The antenna coil 720 includes a plurality of second coil patterns 745 provided on the base material layers 741a to 741h. Specifically, the second coil patterns 45 are defined by metal conductors, and are wound by using the surface (more specifically, the top surface, the bottom surface, and two side surfaces opposite to each other in the Y-axis direction) of the multilayer body 742, in such a way that a winding axis A2 of the antenna coil 720 is perpendicular or substantially perpendicular to a winding axis A1. Instead of being metal conductors provided on two side surfaces opposite to each other in the Y-axis direction, the second coil patterns 45 may be divided via-hole conductors or through-hole conductors, or may be printed conductor patterns.

One end and the other end of the antenna coil 720 are connected to one electrode and the other electrode of the tuning capacitor element 719, through vias and the like in the base material layers 741a to 741h.

In this preferred embodiment, unlike in the thirteenth preferred embodiment of the present invention, the first and second inductor elements 716 and 717 described above are provided within the coil opening of the antenna coil 720. Specifically, the substantial coil portions of the first and second inductor elements 716 and 717 are configured so as not to extend off the antenna coil 720 in top view.

Fifteenth Preferred Embodiment

Figure 31:
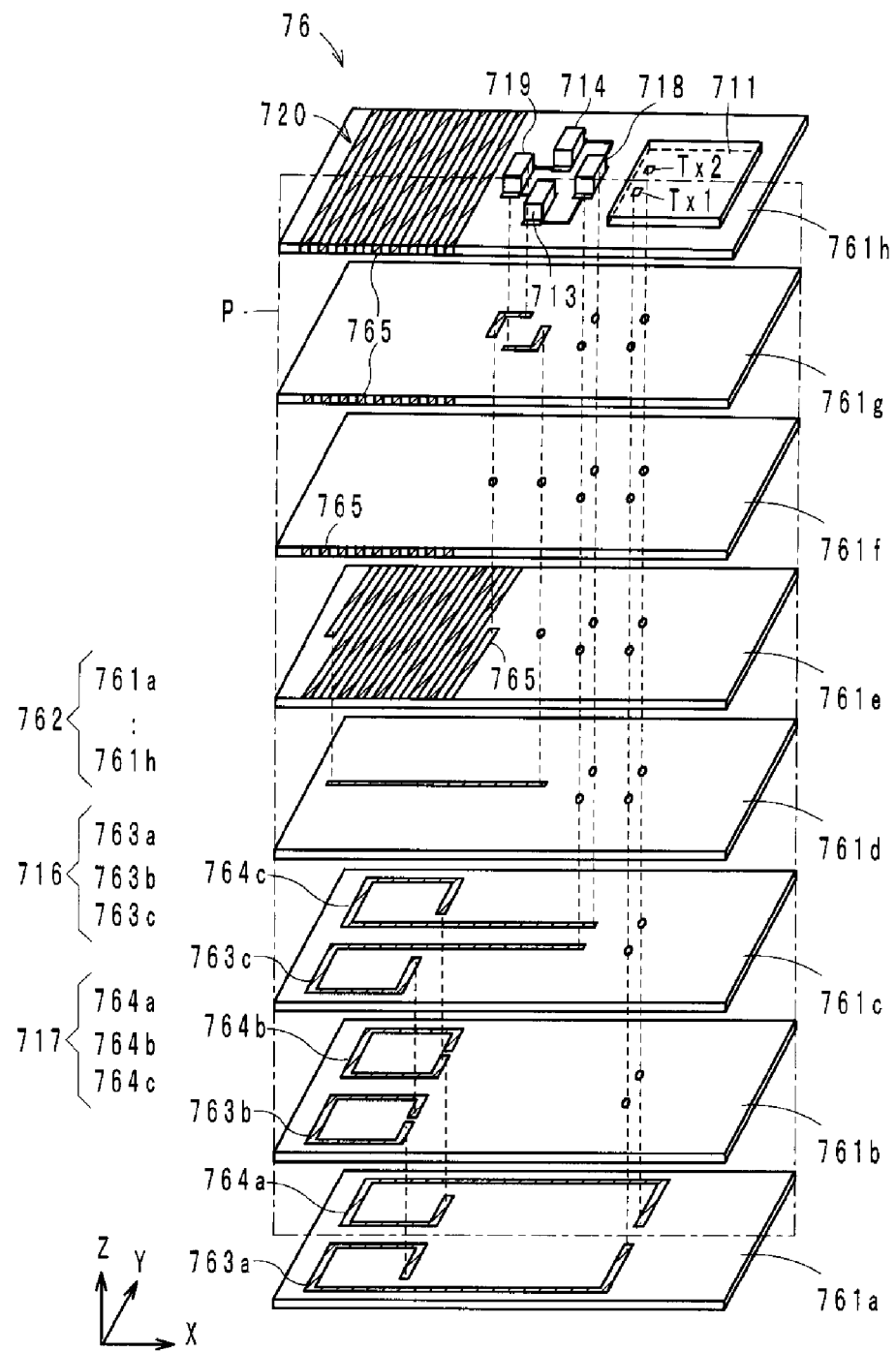
FIG. 31 is a perspective view, exploded for each base material layer, of an RW module according to a fifteenth preferred embodiment of the present invention.
Figure 32:
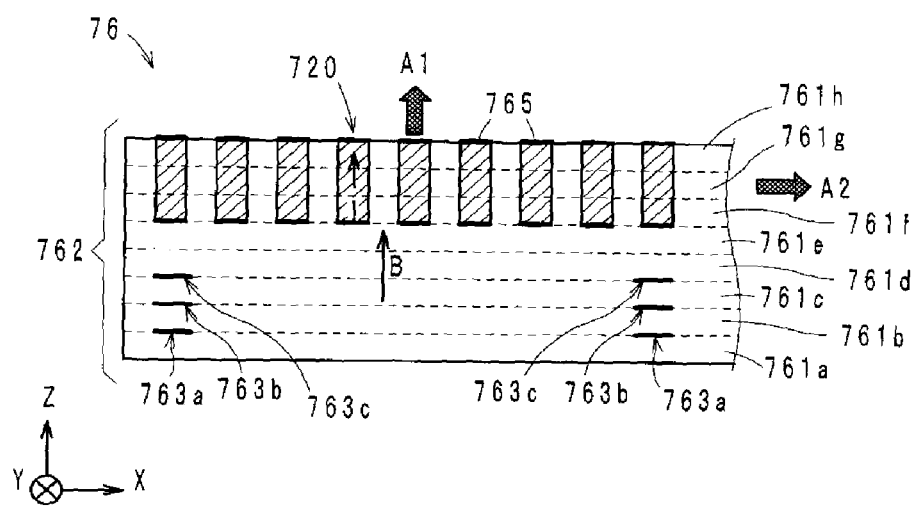
FIG. 32 schematically illustrates an antenna coil and first and second inductor elements as seen from the side of the RW module illustrated in FIG. 31.

Next, with reference to FIGS. 31 and 32, an RW module 76 according to a fifteenth preferred embodiment of the present invention will be described. In FIGS. 31 and 32, components corresponding to those in FIGS. 26 to 28 are denoted by the same reference signs. Further, the X-axis, the Y-axis, and the Z-axis are as defined above with reference to the thirteenth preferred embodiment of the present invention.

The RW module 76 includes a multilayer body 762 preferably having a rectangular or substantially rectangular parallelepiped shape, first and second inductor elements 716 and 717, and an antenna coil 720. The multilayer body 762 includes a stack of eight base material layers 761a to 761h as an example of a plurality of base material layers.

The base material layers 761a to 761h are stacked in this order along the Z-axis direction. The material and shape of each of the base material layers 761a to 761h are preferably the same as those of the base material layer 721a and the like mentioned above. Further, in this preferred embodiment, a center plane P is a plane (indicated by alternate long and short dash lines) bisecting the base material layers 761a and the like perpendicularly or substantially perpendicularly to the Y-axis.

As in the thirteenth preferred embodiment of the present invention, an RW-IC chip 711, first and second capacitor elements 713 and 714, a capacitor element 718, and a tuning capacitor element 719 are mounted on the top surface of the base material layer 761h.

The first and second inductor elements 716 and 717 include a plurality of first coil patterns 763a to 763c and a plurality of first coil patterns 764a to 764c, respectively, which are symmetric in shape with respect to the center plane P, and defined by metal conductors. As in the thirteenth preferred embodiment of the present invention, also in this preferred embodiment, only the first coil patterns 763a to 763c defining the first inductor element 716 will be described in detail.

The first coil patterns 763a to 763c are provided on the top surfaces of the base material layers 761a to 761c, respectively. The first coil patterns 763a to 763c each include a loop conductor that is counterclockwise about a winding axis A1 (see FIG. 32) that is parallel or substantially parallel to the Z-axis.

As illustrated in FIG. 31, one end of the first coil pattern 763a is connected at one end to an output terminal Tx1 through vias formed in the base material layers 761b to 761h. The other end of the first coil pattern 763a is connected to one end of the first coil pattern 763b through a via in the base material layer 761b. The other end of the first coil pattern 763b is connected to one end of the first coil pattern 763c through a via in the base material layer 761c. The other end of the first coil pattern 763c is connected to one electrode of the capacitor element 718 through vias formed in the base material layers 761d to 761h.

The antenna coil 720 includes second coil patterns 765 provided on the base material layers 761e to 761h. Specifically, the second coil patterns 765 are defined by metal conductors. The second coil patterns 765 are wound on the surface (more specifically, the top surface, and a part of two side surfaces opposite to each other in the Y-axis direction) of the multilayer body 762, and the top surface of the base material layer 761e, in such a way that a winding axis A2 (see FIG. 32) of the second coil patterns 765 (antenna coil 720) is perpendicular or substantially perpendicular to a winding axis A1.

As illustrated in FIG. 31, one end of the antenna coil 720 is connected to one electrode of the tuning capacitor element 719, through vias in the base material layers 761e to 761h and conductor patterns provided on the base material layers 761d and 761g. The other end of the antenna coil 720 is connected to the other electrode of the tuning capacitor element 719, through vias in the base material layers 761f to 761h and a conductor pattern provided on the base material layer 761g.

In this preferred embodiment, as in the fourteenth preferred embodiment, the coil portions of the first and second inductor elements 716 and 717 do not extend off the antenna coil 720 in top view. However, this preferred embodiment differs from the fourteenth preferred embodiment in that the first and second inductor elements 716 and 717 are provided below the antenna coil 720.

In the above preferred embodiments, the first and second coil patterns are preferably arranged so that the winding axis A1 of the first coil patterns (the first and second inductor elements 716 and 717), and the winding axis A2 of the second coil patterns (antenna coil 720) are perpendicular or substantially perpendicular to each other. Consequently, as illustrated in FIGS. 28, 30, and 32, it is possible to significantly reduce, minimize or substantially prevent a magnetic flux B generated from the first and second inductor elements 716 and 717 from linking with a current loop I in the antenna coil 720. Likewise, it is possible to significantly reduce, minimize or substantially prevent a magnetic flux generated from the antenna coil 720 from linking with a current loop in each of the first and second inductor elements 716 and 717. Therefore, even when the antenna coil 720 and the first and second inductor elements 716 and 717 are integrated into the same multilayer body 722, 742, or 762, magnetic-field coupling between these components is significantly reduced, minimized or prevented. As a result, radiation of unwanted harmonic components from the antenna coil 720 through the first and second inductor elements 716 and 717 is significantly reduced, minimized or prevented, thus making it possible to provide a miniature RW module 72, 74, or 76 with superior radio frequency characteristics.

Figure 33:
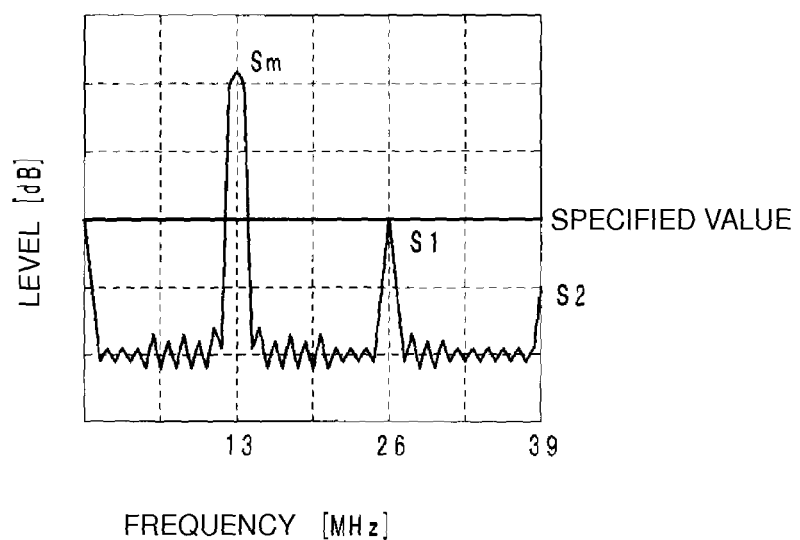
FIG. 33 illustrates a fundamental and harmonics.

In the above preferred embodiments, as a preferred example, a case where the winding axes A1 and A2 are perpendicular or substantially perpendicular to each other has been described. However, this should not be construed restrictively. As illustrated in FIG. 33, the winding axes A1 and A2 may intersect at an angle other than 90° as long as the levels of harmonic components S1, S2, and so on for a fundamental Sm included in a transmitting signal in the 13 MHz band are below, for example, a specified value established by law or regulation. Even in a case where the winding axes A1 and A2 intersect at such an angle, the amount of harmonic components radiated from the antenna coil 720 is at a permissible level. Therefore, it is possible to provide a miniature RW module 72, 74, or 76 having superior radio frequency characteristics.

In the above preferred embodiments, as a preferred example, the base material layers 721a to 721d are made of a magnetic material, and the first and second inductor elements 716 and 717 are completely covered by the magnetic material. As a result, the inductor elements 716 and 717 can be each formed as a closed magnetic circuit structure. Therefore, the magnetic flux generated from each of the first coil patterns hardly goes around the second coil patterns of the antenna coil 720, and hence practically does not contribute to the electromotive force of the second coil patterns. Therefore, even when the first and second coil patterns are disposed in the same multilayer body 722 in close proximity to each other, magnetic coupling between the first and second inductor elements 716 and 717 and the antenna coil 720 is significantly reduced, minimized or prevented. However, such a closed magnetic circuit structure may not necessarily be adopted. As long as it is possible to almost completely prevent a magnetic flux generated from each of the first coil patterns of the first and second inductor elements 716 and 717 from going around the second coil patterns 725 of the antenna coil 720, the base material layer 721, 741, or 761 may be made of a material other than a magnetic material. For example, a non-magnetic layer may be provided on the bottom surface and/or top surface of the multilayer body 722, 742, or 762.

Further, in the thirteenth preferred embodiment of the present invention, the pattern conductors of both the first and second inductor elements 716 and 717, and the antenna coil 720 preferably are provided on the top surface of the same base material layer (for example, the base material layer 721c). Consequently, it is possible to significantly reduce or minimize the height along the Z-axis direction of the RW module 72.

In the above preferred embodiments, as a preferred example, the RW-IC chip 711 is preferably mounted on the top surface of the multilayer body 722, 742, or 762. However, this should not be construed restrictively. The RW-IC chip 711 may be mounted on another circuit board, or may be built in the multilayer body 722 or the like.

In the above preferred embodiments, in the RW module 72, 74, or 76, the RW-IC chip 711 having the balanced output terminals Tx1 and Tx2 preferably is mounted, and a differential signal preferably is transmitted. As a result, signal transmission that is immune to extraneous noise is achieved. However, this should not be construed restrictively. The RW-IC chip 711 may include unbalanced output terminals (that is, a signal terminal and a ground terminal). In this case, while the LPF 712 includes an inductor element connected in series between the signal terminal and the antenna circuit, no inductor element is necessary between the ground terminal and the antenna circuit.

The above preferred embodiments are preferably directed to the case where the LPF 712 is connected to the antenna circuit 715. However, this should not be construed restrictively. Instead of the LPF 712, a matching circuit may be connected to the antenna circuit 715. This matching circuit includes at least one inductance, and matches the impedance between the antenna circuit 715 and the RW-IC chip 711.

In the above preferred embodiments, as illustrated in FIGS. 30 and 32, the coil portions of the first and second inductor elements 716 and 717 preferably do not extend off the antenna coil 720 in top view. However, this should not be construed restrictively. As long as the condition that there be no substantial magnetic coupling between the first and second inductor elements 716 and 717, and the antenna coil 720 is satisfied, the first and second inductor elements 716 and 717 may be displaced in the X-axis direction with respect to the antenna coil 720.

Sixteenth Preferred Embodiment

Figure 34A:
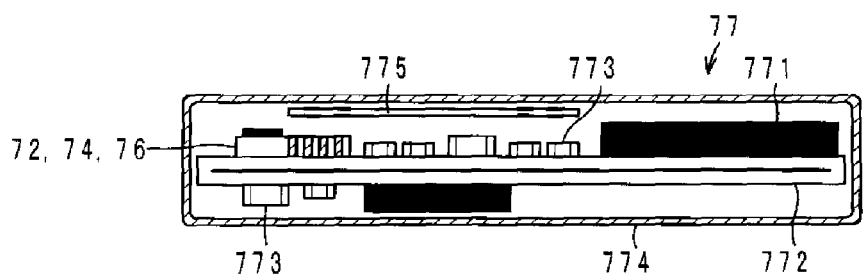
FIG. 34A schematically illustrates an internal configuration of a communication terminal apparatus.

Next, with reference to FIGS. 34A, 34B, 35A, and 35B, a communication terminal apparatus 77 according to a sixteenth preferred embodiment of the present invention will be described. As illustrated in FIG. 34A, the communication terminal apparatus 77 is typically a cellular phone, for example. The communication terminal apparatus 77 includes at least a battery pack 771, and various electronic components 773 mounted on a printed circuit board 772, inside a housing 774.

Figure 34B:
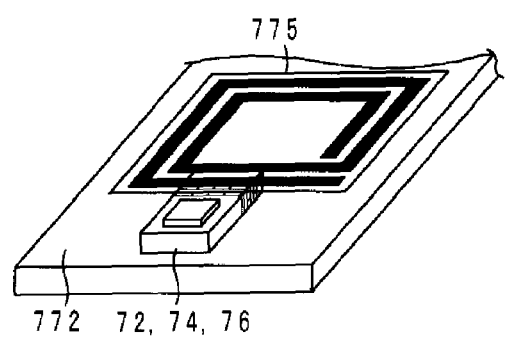
FIG. 34B is an enlarged view of an RW module and a booster antenna.

As illustrated in FIG. 34B and the like, one of the RW modules 72, 74, and 76 is mounted on the printed circuit board 772. However, because the various electronic components 773 and the like for a cellular phone are arranged with high density inside the housing 774, considerable restrictions are placed on the size or layout of the RW module 72 or the like. For this reason, it is preferable to miniaturize the RW module 72 or the like. To miniaturize the RW module 72 or the like, first, it is conceivable to miniaturize the antenna coil 720. However, miniaturization of the antenna coil 720 disadvantageously makes the communication range of the RW module 72 or the like shorter. Accordingly, the communication terminal apparatus 77 further includes a booster antenna 775, which is a separate component from the RW module 72 or the like and has a larger opening than the antenna coil 720.

Figure 35A:
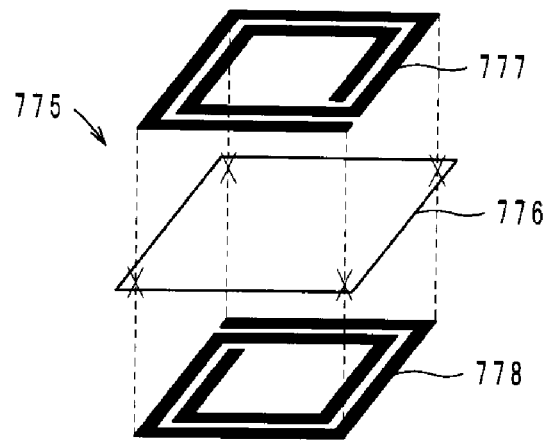
FIG. 35A schematically illustrates a configuration of the booster antenna.
Figure 35B:
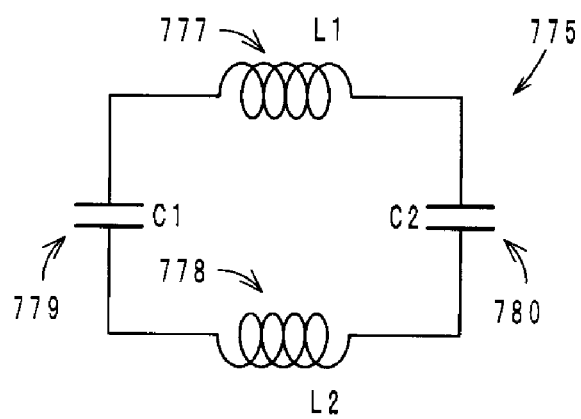
FIG. 35B is an equivalent circuit diagram of the booster antenna.

In the booster antenna 775, as illustrated in FIG. 35A, first and second antenna coils 777 and 778 wound in opposite directions are provided on the top surface and the back surface, respectively, of a base material sheet 776 made of a dielectric material or a magnetic material. Further, as indicated by an equivalent circuit in FIG. 35B, the first and second antenna coils 777 and 778 are connected via capacitor elements 779 and 780. The resonant frequency of the booster antenna 775 is determined by respective inductances L1 and L2 of the antenna coils 777 and 778, and respective capacitance values C1 and C2 of the capacitor elements 779 and 780.

The booster antenna 775 configured as mentioned above is disposed in the housing 774 so as to magnetically couple with the antenna coil 720 of the RW module 72 or the like, and operates as follows. When a differential signal is supplied to the antenna coil 720, an induction magnetic field is generated around the antenna coil 720. When this magnetic field penetrates each of the antenna coils 777 and 778 of the booster antenna 775, an induction current flows through each of the antenna coils 777 and 778, causing magnetic coupling between the antenna coil 720 and the booster antenna 775. Further, as an induction current flows through the booster antenna 775, a magnetic field is generated from the booster antenna 775 having a relatively large coil opening, thus making it possible to increase the communication range.

Since the booster antenna 775 can be made thinner than the RW module 72 or the like, and simply receives electric power supply without pin or wiring connections, the booster antenna 775 can be disposed in a narrow space inside the housing 774. Use of the booster antenna 775 as mentioned above increases the freedom of layout of the RW module 72 or the like, and further enables miniaturization of the antenna coil 720.

As described above, according to this preferred embodiment, not only the same operation/effect as the thirteenth to fifteenth preferred embodiments is attained, but the use of the booster antenna 775 makes it possible to provide a communication terminal apparatus that secures a sufficient communication range while achieving miniaturization of the antenna coil 720.

The antenna device and the communication terminal apparatus according to various preferred embodiments of the present invention make it possible to significantly reduce, minimize or prevent radiation of unwanted harmonics. Such an antenna device finds utility in, for example, RFID tags, contactless IC cards, or reader/writers, and the communication terminal apparatus finds utility in cellular phones and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a multilayer body including magnetic layers or dielectric layers that are stacked; and
an outer coil conductor that has a winding axis extending in a direction perpendicular or substantially perpendicular to a stacking direction of the multilayer body, the outer coil conductor being disposed so as to extend around a periphery, or a portion of the periphery, of the multilayer body; wherein
an inner coil conductor is provided within a winding area of the outer coil conductor, the inner coil conductor having a winding axis extending in a direction perpendicular or substantially perpendicular to the winding axis of the outer coil conductor;
the outer coil conductor has a structure that defines and functions as an antenna, and the inner coil conductor has a structure that defines and functions as an inductor; and
at least a first end of the outer coil conductor and an end of the inner coil conductor are connected to each other.

2. The antenna device according to claim 1, wherein the inner coil conductor is provided on a plurality of layers of the multilayer body.

3. The antenna device according to claim 1, wherein the inner coil conductor includes a first inner coil conductor and a second inner coil conductor, the first inner coil conductor and the second inner coil conductor having winding axes parallel or substantially parallel to each other.

4. The antenna device according to claim 3, wherein in plan view from the stacking direction of the multilayer body, a coil opening of the first inner coil conductor and a coil opening of the second inner coil conductor overlap each other.

5. The antenna device according to claim 1, wherein the outer coil conductor is provided on a layer that contacts a magnetic layer or on a magnetic layer, and the inner coil conductor is provided a layer that contacts a non-magnetic layer or on a non-magnetic layer.

6. The antenna device according to claim 2, wherein the outer coil conductor is provided on a magnetic layer or on a layer that contacts a magnetic layer, and a magnetic layer is provided between different layers of the inner coil conductor.

7. The antenna device according to of claim 1, wherein a portion of the outer coil conductor is a via-hole conductor provided on a magnetic layer.

8. The antenna device according to claim 1, wherein a capacitance-generating electrode is provided on the multi-layer body, and a filter is defined by a capacitance due to the capacitance-generating electrode and the inner coil conductor.

9. A radio communication apparatus comprising:
a communication circuit; and
the antenna device according to claim 1.

\* \* \* \* \*